US008340325B2

(12) United States Patent
Oh et al.

(10) Patent No.: US 8,340,325 B2
(45) Date of Patent: Dec. 25, 2012

(54) METHOD AND AN APPARATUS FOR DECODING AN AUDIO SIGNAL

(75) Inventors: Hyen-O Oh, Goyang-si (KR); Yang-Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1249 days.

(21) Appl. No.: 11/952,949

(22) Filed: Dec. 7, 2007

(65) Prior Publication Data

US 2008/0205671 A1 Aug. 28, 2008

Related U.S. Application Data

(60) Provisional application No. 60/869,077, filed on Dec. 7, 2006, provisional application No. 60/883,569, filed on Jan. 5, 2007, provisional application No. 60/884,043, filed on Jan. 9, 2007, provisional application No. 60/884,347, filed on Jan. 10, 2007, provisional application No. 60/884,585, filed on Jan. 11, 2007, provisional application No. 60/885,343, filed on Jan. 17, 2007, provisional application No. 60/885,347, filed on Jan. 17, 2007, provisional application No. 60/889,715, filed on Feb. 13, 2007, provisional application No. 60/877,134, filed on Dec. 27, 2006, provisional application No. 60/955,395, filed on Aug. 13, 2007.

(51) Int. Cl.
*H04B 1/00* (2006.01)

(52) U.S. Cl. ............................... 381/119; 381/2; 381/17

(58) Field of Classification Search .................. 381/119, 381/2, 17, 18, 19
See application file for complete search history.

(56) References Cited

U.S. PATENT DOCUMENTS

| | | | | |
|---|---|---|---|---|
| 5,974,380 | A | 10/1999 | Smyth | |
| 6,026,168 | A | 2/2000 | Li et al. | |
| 6,122,619 | A | 9/2000 | Kolluru | |
| 6,128,597 | A | 10/2000 | Kolluru | |
| 6,141,446 | A | 10/2000 | Boliek | |
| 6,496,584 | B2 | 12/2002 | Irwan et al. | |
| 6,584,077 | B1 | 6/2003 | Polomski | |
| 6,952,677 | B1 | 10/2005 | Absar | |
| 7,103,187 | B1 | 9/2006 | Neuman | |
| 7,382,886 | B2 | 6/2008 | Henn et al. | |
| 7,783,049 | B2 | 8/2010 | Oh et al. | |
| 7,783,051 | B2 * | 8/2010 | Oh et al. | 381/22 |
| 8,139,775 | B2 | 3/2012 | Hilpert et al. | |
| 2003/0023160 | A1 | 1/2003 | Minkoff | |

(Continued)

FOREIGN PATENT DOCUMENTS

CN 1337042 2/2002

(Continued)

OTHER PUBLICATIONS

International Search Report corresponding to International Application No. PCT/KR2008/005292 dated Feb. 28, 2009, 3 pages.

(Continued)

*Primary Examiner* — Charles Garber
*Assistant Examiner* — Reema Patel
(74) *Attorney, Agent, or Firm* — Fish & Richardson P.C.

(57) ABSTRACT

A method for processing an audio signal, comprising: receiving a downmix signal, an object information, and a mix information; generating a multi-channel information including at least one gain modification factor using the object information and the mix information, wherein the gain modification factor corresponds to a time-subband-variant factor for controlling gain of the downmix signal is disclosed.

4 Claims, 21 Drawing Sheets

U.S. PATENT DOCUMENTS

| | | | |
|---|---|---|---|
| 2003/0117759 | A1 | 6/2003 | Cooper |
| 2003/0236583 | A1 | 12/2003 | Baumgarte et al. |
| 2004/0111171 | A1 | 6/2004 | Jang et al. |
| 2005/0089181 | A1 | 4/2005 | Polk, Jr. |
| 2005/0117759 | A1 | 6/2005 | Wu |
| 2005/0157883 | A1 | 7/2005 | Herre |
| 2005/0195981 | A1 | 9/2005 | Faller |
| 2006/0009225 | A1 | 1/2006 | Herre et al. |
| 2006/0085200 | A1 | 4/2006 | Allamanche |
| 2006/0115100 | A1 | 6/2006 | Faller |
| 2006/0133618 | A1 | 6/2006 | Villemoes |
| 2006/0140412 | A1 | 6/2006 | Villemoes et al. |
| 2006/0262936 | A1 | 11/2006 | Sato |
| 2007/0019813 | A1 | 1/2007 | Hilpert et al. |
| 2007/0055510 | A1 | 3/2007 | Hilpert et al. |
| 2007/0083365 | A1 | 4/2007 | Shmunk |
| 2007/0127733 | A1 | 6/2007 | Henn et al. |
| 2008/0008323 | A1 | 1/2008 | Hilpert et al. |
| 2009/0129601 | A1 | 5/2009 | Ojala et al. |

FOREIGN PATENT DOCUMENTS

| | | |
|---|---|---|
| CN | 1783728 | 6/2006 |
| EP | 00798866 | 10/1997 |
| EP | 1 107 232 | 6/2001 |
| EP | 1 416 769 | 10/2003 |
| EP | 1565036 | 8/2005 |
| EP | 1640972 | 3/2006 |
| EP | 1691348 | 8/2006 |
| EP | 1784819 | 4/2008 |
| JP | 2004170610 | 6/2004 |
| JP | 2004080735 | 9/2004 |
| JP | 18-323408 | 11/2006 |
| JP | 18323408 | 11/2006 |
| JP | 2009-501948 A | 1/2009 |
| JP | 2009-543142 A | 12/2009 |
| JP | 2010-505141 | 2/2010 |
| JP | 2010-507115 | 3/2010 |
| JP | 2010-154548 A | 7/2010 |
| KR | 200000053152 | 8/2000 |
| KR | 1020060049980 | 5/2006 |
| KR | 1020060060927 | 6/2006 |
| KR | 10-2006-0122734 | 11/2006 |
| KR | 1020060049941 | 2/2009 |
| RU | 2214048 | 10/2003 |
| RU | 2005104123 | 7/2005 |
| TW | 396713 | 7/2000 |
| TW | 200628001 | 8/2006 |
| TW | 200631449 | 9/2006 |
| WO | 92/12607 | 7/1992 |
| WO | 9858450 | 12/1998 |
| WO | 03090207 | 10/2003 |
| WO | 03090208 | 10/2003 |
| WO | 2005029467 | 3/2005 |
| WO | 2005/069274 | 7/2005 |
| WO | 2005/086139 | 9/2005 |
| WO | 2005086139 | 9/2005 |
| WO | 2005/101370 | 10/2005 |
| WO | WO 2005/101905 A1 | 10/2005 |
| WO | 2006/002748 | 1/2006 |
| WO | 2006/003891 | 1/2006 |
| WO | 2006/006809 | 1/2006 |
| WO | 2006002748 | 1/2006 |
| WO | 2006008683 | 1/2006 |
| WO | WO 2006/008697 A1 | 1/2006 |
| WO | 2006/041137 | 4/2006 |
| WO | 2006/048203 | 5/2006 |
| WO | 2006/084916 | 8/2006 |
| WO | 2006084916 | 8/2006 |
| WO | WO 2006/103584 | 10/2006 |
| WO | 2006/126857 | 11/2006 |
| WO | 2006/126858 | 11/2006 |
| WO | 2006/126859 | 11/2006 |
| WO | 2006132857 | 12/2006 |
| WO | 2007/013775 | 2/2007 |
| WO | 2008/035275 | 3/2008 |
| WO | 2008/046530 | 4/2008 |

OTHER PUBLICATIONS

International Search Report in International Application No. PCT/KR2007/005740, dated Feb. 27, 2008, 2 pages.

International Search Report in International Application No. PCT/KR2007/006318, dated Mar. 17, 2008, 2 pages.

International Search Report in International Application No. PCT/KR2008/000073, dated Apr. 22, 2008, 3 pages.

International Search Report in International Application No. PCT/KR2008/000836, dated Jun. 11, 2008, 3 pages.

International Search Report in International Application No. PCT/KR2007/005014, dated Jan. 28, 2008, 2 pages.

International Search Report in International Application No. PCT/KR2007/004805, dated Feb. 11, 2008, 2 pages.

European Search Report in European application No. EP07009077, dated Aug. 23, 2007, 3 pages.

Breebaart, et al.: "MPEG Spatial Audio Coding/MPEG Surround: Overview and Current Status" In: Audio Engineering Society the 119th Convention, New York, New York, Oct. 7-10, 2005, pp. 1-17. See pp. 4-6.

Vera-Candeas, P., et al.: "A New Sinusoidal Modeling Approach for Parametric Speech and Audio Coding", Proceedings of the 3rd International Symposium on Image and Signal Processing and Analysis, 2003, XP010705037.

Faller, C.: "Coding of spatial audio compatible with different playback formats" Audio Engineering Society, Convention Paper, In 117th Convention, Oct. 28-31, 2004, San Francisco, CA. XP002364728.

Tilman Liebchen et al., "The MPEG-4 audio lossless coding (ALS) standard—Technology and applications", AES 119th Convention paper, Oct. 7-10, 2005, New York, USA.

Tilman Liebchen et al., "Improved Forward-Adaptive Prediction for MPEG-4 audio lossless coding", AES 119th Convention paper, May 28-31, 2005, Barcelona, Spain.

International Search Report in International Application No. PCT/KR2006/002974, dated Nov. 17, 2006, 1 page.

Breebaart et al., "Multi-Channel Goes Mobile: MPEG Surround Binaural Rendering", AES 29th International Conference, Seoul, Korea, Sep. 2-4, 2006, pp. 1-13. XP007902577.

European Search Report for Application No. 7851289, dated Dec. 16, 2009, 8 pages.

Notice of Allowance, Korean Appln. No. 10-2009-7014215, dated Sep. 23, 2011, 3 pages with English translation.

Notice of Allowance, Korean Appln. No. 10-2009-7014212, dated Oct. 28, 2011, 3 pages with English translation.

Office Action, Korean Application No. 10-2009-7014216, dated Mar. 23, 2011, 9 pages with English translation.

Notice of Allowance, Russian Appln. No. 2009125909, dated Sep. 10, 2010, 9 pages.

Villemones L et al: "MPEG Surround: the forthcoming ISO Standard for Spatial Audio Coding" Proceedings of the International AES Conferences, XX, XX, Jun. 30, 2006, pp. 1-18, XP002405379.

European Search Report for Application No. 07851288, dated Dec. 18, 2009, 7 pages.

International Search Report in corresponding PCT app #PCT/KR2007/006318 dated Mar. 17, 2008, 3 pages.

Engdegard, J., et al., "Spatial Audio Object Coding (SAOC)—The Upcoming MPEG Standard on Parametric Object Based Audio Coding," Audio Engineering Society Convention Paper 7377, 124th Convention, Amsterdam, The Netherlands, May 2008, 15 pages.

Faller, C., et al,, "Binaural Cue Coding Applied to Audio Compression with Flexible Rendering," Audio Engineering Society Convention Paper 5686, 113th Convention, Los Angeles, California, Oct. 2008, 10 pages.

Faller, C., "Parametric Joint-Coding of Audio Sources", Audio Engineering Society Convention Paper 6752, 120th Convention, May 2006, Paris, France, 12 pages.

Faller, C., "Parametric Coding of Spatial Audio", Doctoral Thesis No. 3062, 2004.

Kim, J., "Lossless Wideband Audio Compression: Prediction and Transform", 2003.

Smet, P., et al., "Subband Based MPEG Audio Mixing for Internet Streaming Applications", IEEE, 2001.

Notice of Allowance dated Feb. 28, 2009 for Korean applications Nos. 2007-63180; 63187; 63291 and 63292.
Christof Faller, 'Parametric coding of spatial audio' Presentee a La Faculte Informatique Et Communications, Institute de Systemes de Communication, Section Des Systemes De Communication, Ecole Polytechnique Federale De Lausanne, Pour L'Obtention Du Grade De Docteur Es Sciences, These No. 3062, 2004. See Chapter 3. Parametric Coding of Spatial Audio Using Perceptual Cues, 165 pages.
International Search Report and Written Opinion for PCT/KR2008/005292, dated Feb. 28, 2009, 3 pages.
Notice of Allowance for U.S. Appl. No. 12/573,077 dated Mar. 12, 2010, 13 pages.
"Call for Proposals on Spatial Audio Object Coding", Joint Video Team of ISO/IEC MPEG & ITU-T VCEG (ISO/IEC JTC1/SC29/WG11 and ITU-T SG16 Q6), No. N8853, Marrakech, Morocco, (2007), 20 pages.
"Draft Call for Proposals on Spatial Audio Object Coding", Joint Video Team of ISO/IEC MPEG & ITU-T VCEG (ISO/IEC JTC1/SC29/WG11 and ITU-T SG16 Q6), No. N8639, Hangzhou, China, (2006), 16 pages.
Herre et al., "From Channel-Oriented to Object-Oriented Spatial Audio Coding", Joint Video Team of ISO/IEC MPEG & ITU-T VCEG (ISO/IEC JTC1/SC29/WG11 and ITU-T SG16 Q6), No. M13632, (2006), 9 pages.
European Search Report for Application No. 07851286, dated Dec. 16, 2009, 5 pages.
European Search Report for Application No. 07851287, dated Dec. 16, 2009, 6 pages.
Notice of Allowance, U.S. Appl. No. 11/952,957, dated Feb. 27, 2012, 12 pages.
Office Action, Taiwanese Appln. No. 096146865, dated Dec. 28, 2011, 8 pages with English translation.
Office Action in U.S. Appl. No. 11/952,916, dated Sep. 20, 2012, 18 pages.

* cited by examiner

METHOD AND AN APPARATUS FOR DECODING AN AUDIO SIGNAL

RELATED APPLICATIONS

This application claims the benefit of U.S. Provisional Application Nos. 60/869,077 filed on Dec. 7, 2006, 60/877,134 filed on Dec. 27, 2006, 60/883,569 filed on Jan. 5, 2007, 60/884,043 filed on Jan. 9, 2007, 60/884,347 filed on Jan. 10, 2007, 60/884,585 filed on Jan. 11, 2007, 60/885,347 filed on Jan. 17, 2007, 60/885,343 filed on Jan. 17, 2007, 60/889,715 filed on Feb. 13, 2007 and 60/955,395 filed on Aug. 13, 2007, which are hereby incorporated by reference as if fully set forth herein.

BACKGROUND OF THE INVENTION

1. Field of the Invention

The present invention relates to a method and an apparatus for processing an audio signal, and more particularly, to a method and an apparatus for decoding an audio signal received on a digital medium, as a broadcast signal, and so on.

2. Discussion of the Related Art

While downmixing several audio objects to be a mono or stereo signal, parameters from the individual object signals can be extracted. These parameters can be used in a decoder of an audio signal, and repositioning/panning of the individual sources can be controlled by user' selection.

However, in order to control the individual object signals, repositioning/panning of the individual sources included in a downmix signal must be performed suitably.

However, for backward compatibility with respect to the channel-oriented decoding method (as a MPEG Surround), an object parameter must be converted flexibly to a multi-channel parameter required in upmixing process.

SUMMARY

Accordingly, the present invention is directed to a method and an apparatus for processing an audio signal that substantially obviates one or more problems due to limitations and disadvantages of the related art.

An object of the present invention is to provide a method and an apparatus for processing an audio signal to control object gain and panning unrestrictedly.

Another object of the present invention is to provide a method and an apparatus for processing an audio signal to control object gain and panning based on user selection.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing an audio signal, comprising: receiving a downmix signal, an object information, and a mix information; generating a multi-channel information including at least one gain modification factor using the object information and the mix information, wherein the gain modification factor corresponds to a time-subband-variant factor for controlling gain of the downmix signal.

According to the present invention, wherein the generating a multi-channel information is performed if the downmix signal corresponds to a mono signal.

According to the present invention, wherein the gain modification factor describes a ratio of a first gain estimated based on the mix information and the object information over a second gain estimated based on the object information.

According to the present invention, further comprising, generating a multi-channel bitstream using the multi-channel information including the gain modification factor.

According to the present invention, further comprising, generating a downmix processing information using the object information and the mix information; and, processing the downmix signal using the downmix processing information, wherein the downmix processing information corresponds to an information for controlling object panning if the downmix signal corresponds to a stereo signal.

According to the present invention, wherein the mix information is generated using at least one of an object position information and a playback configuration information.

According to the present invention, wherein the downmix signal is received as a broadcast signal.

According to the present invention, wherein the downmix signal is received on a digital medium.

An another aspect of the present invention, a method for processing an audio signal, comprising: receiving an object information, and a mix information; generating a multi-channel information using the object information, and the mix information; generating an extra multi-channel information using the mix information; and, transmitting the multi-channel information and the extra multi-channel information, wherein the multi-channel information corresponds to an information for upmixing a downmix signal into a multi-channel signal, and the extra multi-channel information corresponds to an information for modifying the multi-channel signal.

According to the present invention, wherein the extra multi-channel information includes HRTF information for binaural mode.

According to the present invention, wherein the HRTF information describes a virtual position of an object at certain time.

According to the present invention, wherein the HRTF information is generated using HRTF database.

According to the present invention, wherein the generating a multi-channel information and the generating a extra multi-channel information are performed in the same subband domain.

According to the present invention, wherein the extra multi-channel information is transmitted in synchronization with the multi-channel information.

According to the present invention, wherein the downmix signal is received as a broadcast signal.

According to the present invention, wherein the downmix signal is received on a digital medium.

An another aspect of the present invention, a computer-readable medium having instructions stored thereon, which, when executed by a processor, causes the processor to perform operations, comprising: receiving a downmix signal, an object information, and a mix information; generating a multi-channel information including at least one gain modification factor using the object information and the mix information, wherein the gain modification factor corresponds to a time-subband-variant factor for controlling gain of the downmix signal.

An another aspect of the present invention, a computer-readable medium having instructions stored thereon, which, when executed by a processor, causes the processor to perform operations, comprising: receiving an object information, and a mix information; generating a multi-channel information using the object information, and the mix information; generating an extra multi-channel information using the mix information; and, transmitting the multi-channel information and the extra multi-channel information, wherein the multi-channel information corresponds to an information for upmixing a downmix signal into a multi-channel signal, and the extra multi-channel information corresponds to an information for modifying the multi-channel signal.

An another aspect of the present invention, an apparatus for processing an audio signal, comprising: a user interface receiving a mix information; and, an information generating unit receiving an object information and the mix information, and generating a multi-channel information including at least one gain modification factor using the object information and the mix information, wherein the gain modification factor corresponds to a time-subband-variant factor for controlling gain of the downmix signal.

An another aspect of the present invention, an apparatus for processing an audio signal, comprising: a user interface receiving a mix information; and, an information generating unit receiving an object information, generating an multi-channel information using the object information and the mix information, generating an extra multi-channel information using the mix information; and, transmitting the multi-channel information and the extra multi-channel information, wherein the multi-channel information corresponds to an information for upmixing a downmix signal into a multi-channel signal, and the extra multi-channel information corresponds to an information for modifying the multi-channel signal.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

In particular, 'parameter' in the following description means information including values, parameters of narrow sense, coefficients, elements, and so on. Hereinafter 'parameter' term will be used instead of 'information' term like an object parameter, a mix parameter, a downmix processing parameter, and so on, which does not put limitation on the present invention.

In downmixing several channel signals or object signals, an object parameter and a spatial parameter can be extracted. A decoder can generate output signal using a downmix signal and the object parameter (or the spatial parameter). The output signal may be rendered based on playback configuration and user control by the decoder. The rendering process shall be explained in details with reference to the FIG. 1 as follow.

Figure 1:
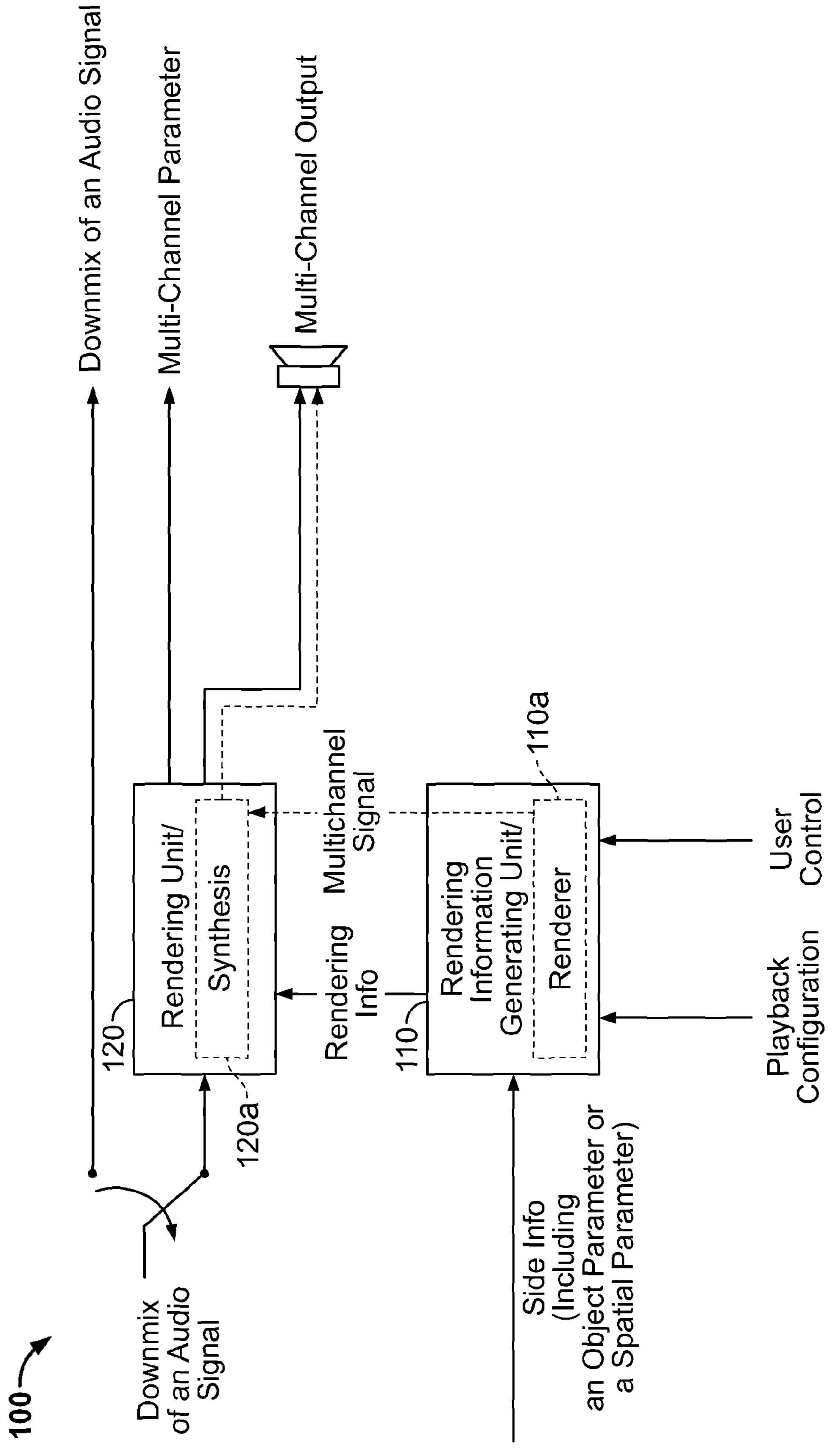
FIG. 1 is an exemplary block diagram to explain to basic concept of rendering a downmix signal based on playback configuration and user control.

FIG. 1 is an exemplary diagram to explain to basic concept of rendering downmix based on playback configuration and user control. Referring to FIG. 1, a decoder 100 may include a rendering information generating unit 110 and a rendering unit 120, and also may include a renderer 110$a$ and a synthesis 120$a$ instead of the rendering information generating unit 110 and the rendering unit 120.

A rendering information generating unit 110 can be configured to receive a side information including an object parameter or a spatial parameter from an encoder, and also to receive a playback configuration or a user control from a device setting or a user interface. The object parameter may correspond to a parameter extracted in downmixing at least one object signal, and the spatial parameter may correspond to a parameter extracted in downmixing at least one channel signal. Furthermore, type information and characteristic information for each object may be included in the side information. Type information and characteristic information may describe instrument name, player name, and so on. The playback configuration may include speaker position and ambient information (speaker's virtual position), and the user control may correspond to a control information inputted by a user in order to control object positions and object gains, and also may correspond to a control information in order to the playback configuration. Meanwhile the payback configuration and user control can be represented as a mix information, which does not put limitation on the present invention.

A rendering information generating unit 110 can be configured to generate a rendering information using a mix information (the playback configuration and user control) and the received side information. A rendering unit 120 can configured to generate a multi-channel parameter using the rendering information in case that the downmix of an audio signal (abbreviated 'downmix signal') is not transmitted, and generate multi-channel signals using the rendering information and downmix in case that the downmix of an audio signal is transmitted.

A renderer 110$a$ can be configured to generate multi-channel signals using a mix information (the playback configuration and the user control) and the received side information. A synthesis 120$a$ can be configured to synthesis the multi-channel signals using the multi-channel signals generated by the renderer 110$a$.

As previously stated, the decoder may render the downmix signal based on playback configuration and user control. Meanwhile, in order to control the individual object signals, a decoder can receive an object parameter as a side information and control object panning and object gain based on the transmitted object parameter.

1. Controlling Gain and Panning of Object Signals

Variable methods for controlling the individual object signals may be provided. First of all, in case that a decoder receives an object parameter and generates the individual object signals using the object parameter, then, can control the individual object signals base on a mix information (the playback configuration, the object level, etc.)

Secondly, in case that a decoder generates the multi-channel parameter to be inputted to a multi-channel decoder, the multi-channel decoder can upmix a downmix signal received from an encoder using the multi-channel parameter. The above-mention second method may be classified into three types of scheme. In particular, 1) using a conventional multi-channel decoder, 2) modifying a multi-channel decoder, 3) processing downmix of audio signals before being inputted to a multi-channel decoder may be provided. The conventional multi-channel decoder may correspond to a channel-oriented spatial audio coding (ex: MPEG Surround decoder), which does not put limitation on the present invention. Details of three types of scheme shall be explained as follow.

1.1 Using a Multi-Channel Decoder

First scheme may use a conventional multi-channel decoder as it is without modifying a multi-channel decoder. At first, a case of using the ADG (arbitrary downmix gain) for controlling object gains and a case of using the 5-2-5 configuration for controlling object panning shall be explained with reference to FIG. 2 as follow. Subsequently, a case of being linked with a scene remixing unit will be explained with reference to FIG. 3.

Figure 2:
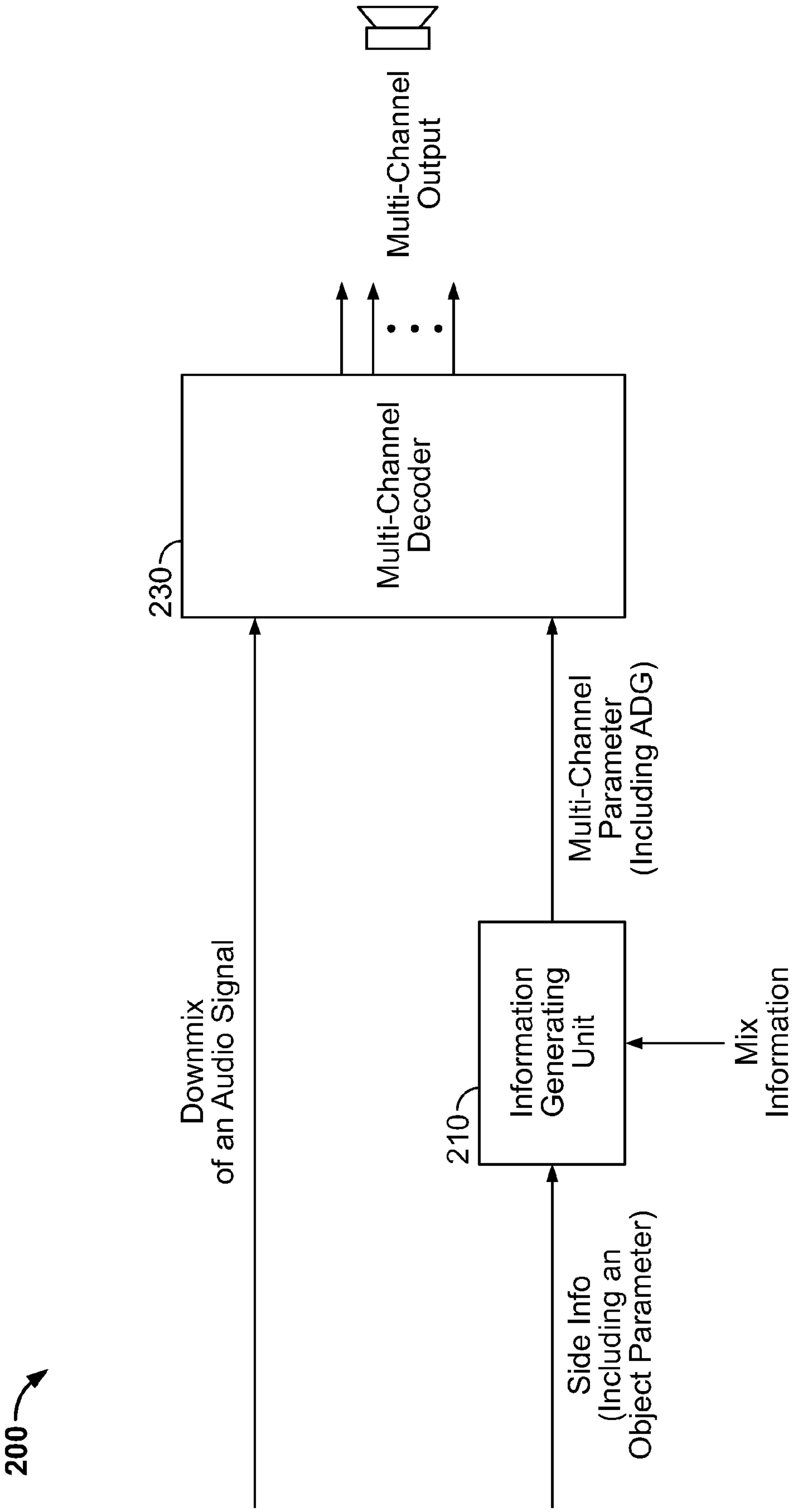
FIG. 2 is an exemplary block diagram of an apparatus for processing an audio signal according to one embodiment of the present invention corresponding to the first scheme.

FIG. 2 is an exemplary block diagram of an apparatus for processing an audio signal according to one embodiment of the present invention corresponding to first scheme. Referring to FIG. 2, an apparatus for processing an audio signal 200 (hereinafter simply 'a decoder 200') may include an information generating unit 210 and a multi-channel decoder 230. The information generating unit 210 may receive a side information including an object parameter from an encoder and a mix information from a user interface, and may generate a multi-channel parameter including a arbitrary downmix gain or a gain modification gain (hereinafter simple 'ADG'). The ADG may describe a ratio of a first gain estimated based on the mix information and the object information over a second gain estimated based on the object information. In particular, the information generating unit 210 may generate the ADG only if the downmix signal corresponds to a mono signal. The multi-channel decoder 230 may receive a downmix of an audio signal from an encoder and a multi-channel parameter from the information generating unit 210, and may generate a multi-channel output using the downmix signal and the multi-channel parameter.

The multi-channel parameter may include a channel level difference (hereinafter abbreviated 'CLD'), an inter channel correlation (hereinafter abbreviated 'ICC'), a channel prediction coefficient (hereinafter abbreviated 'CPC').

Since CLD, ICC, and CPC describe intensity difference or correlation between two channels, and is to control object panning and correlation. It is able to control object positions and object diffuseness (sonority) using the CLD, the ICC, etc. Meanwhile, the CLD describes the relative level difference instead of the absolute level, and energy of the two channels is conserved. Therefore it is unable to control object gains by handling CLD, etc. In other words, specific object cannot be mute or volume up by using the CLD, etc.

Furthermore, the ADG describes time and frequency dependent gain for controlling correction factor by a user. If this correction factor be applied, it is able to handle modification of down-mix signal prior to a multi-channel upmixing. Therefore, in case that ADG parameter is received from the information generating unit 210, the multi-channel decoder 230 can control object gains of specific time and frequency using the ADG parameter.

Meanwhile, a case that the received stereo downmix signal outputs as a stereo channel can be defined the following formula 1.

$$y[0]=w_{11}\cdot g_0\cdot x[0]+w_{12}\cdot g_1\cdot x[1]$$

$$y[1]=w_{21}\cdot g_0\cdot x[0]+w_{22}\cdot g_1\cdot x[1] \qquad \text{[formula 1]}$$

where x[ ] is input channels, y[ ] is output channels, $g_x$ is gains, and $w_{xx}$ is weight.

It is necessary to control cross-talk between left channel and right channel in order to object panning. In particular, a part of left channel of downmix signal may output as a right channel of output signal, and a part of right channel of downmix signal may output as left channel of output signal. In the formula 1, $w_{12}$ and $w_{21}$ may be a cross-talk component (in other words, cross-term).

The above-mentioned case corresponds to 2-2-2 configuration, which means 2-channel input, 2-channel transmission, and 2-channel output. In order to perform the 2-2-2 configuration, 5-2-5 configuration (2-channel input, 5-channel transmission, and 2 channel output) of conventional channel-oriented spatial audio coding (ex: MPEG surround) can be used. At first, in order to output 2 channels for 2-2-2 configuration, certain channel among 5 output channels of 5-2-5 configuration can be set to a disable channel (a fake channel). In order to give cross-talk between 2-transmitted channels and 2-output channels, the above-mentioned CLD and CPC may be adjusted. In brief, gain factor $g_x$ in the formula 1 is obtained using the above mentioned ADG, and weighting factor $w_{11}$~$w_{22}$ in the formula 1 is obtained using CLD and CPC.

In implementing the 2-2-2 configuration using 5-2-5 configuration, in order to reduce complexity, default mode of conventional spatial audio coding may be applied. Since characteristic of default CLD is supposed to output 2-channel, it is able to reduce computing amount if the default CLD is applied. Particularly, since there is no need to synthesis a fake channel, it is able to reduce computing amount largely. Therefore, applying the default mode is proper. In particular, only default CLD of 3 CLDs (corresponding to 0, 1, and 2 in MPEG surround standard) is used for decoding. On the other hand, 4 CLDs among left channel, right channel, and center channel (corresponding to 3, 4, 5, and 6 in MPEG surround standard) and 2 ADGs (corresponding to 7 and 8 in MPEG surround standard) is generated for controlling object. In this case, CLDs corresponding 3 and 5 describe channel level difference between left channel plus right channel and center channel ((1+r)/c) is proper to set to 150 dB (approximately infinite) in order to mute center channel. And, in order to implement cross-talk, energy based up-mix or prediction based up-mix may be performed, which is invoked in case that TTT mode ('bsTttModeLow' in the MPEG surround standard) corresponds to energy-based mode (with subtraction, matrix compatibility enabled) ($3^{rd}$ mode), or prediction mode ($1^{st}$ mode or $2^{nd}$ mode).

Figure 3:
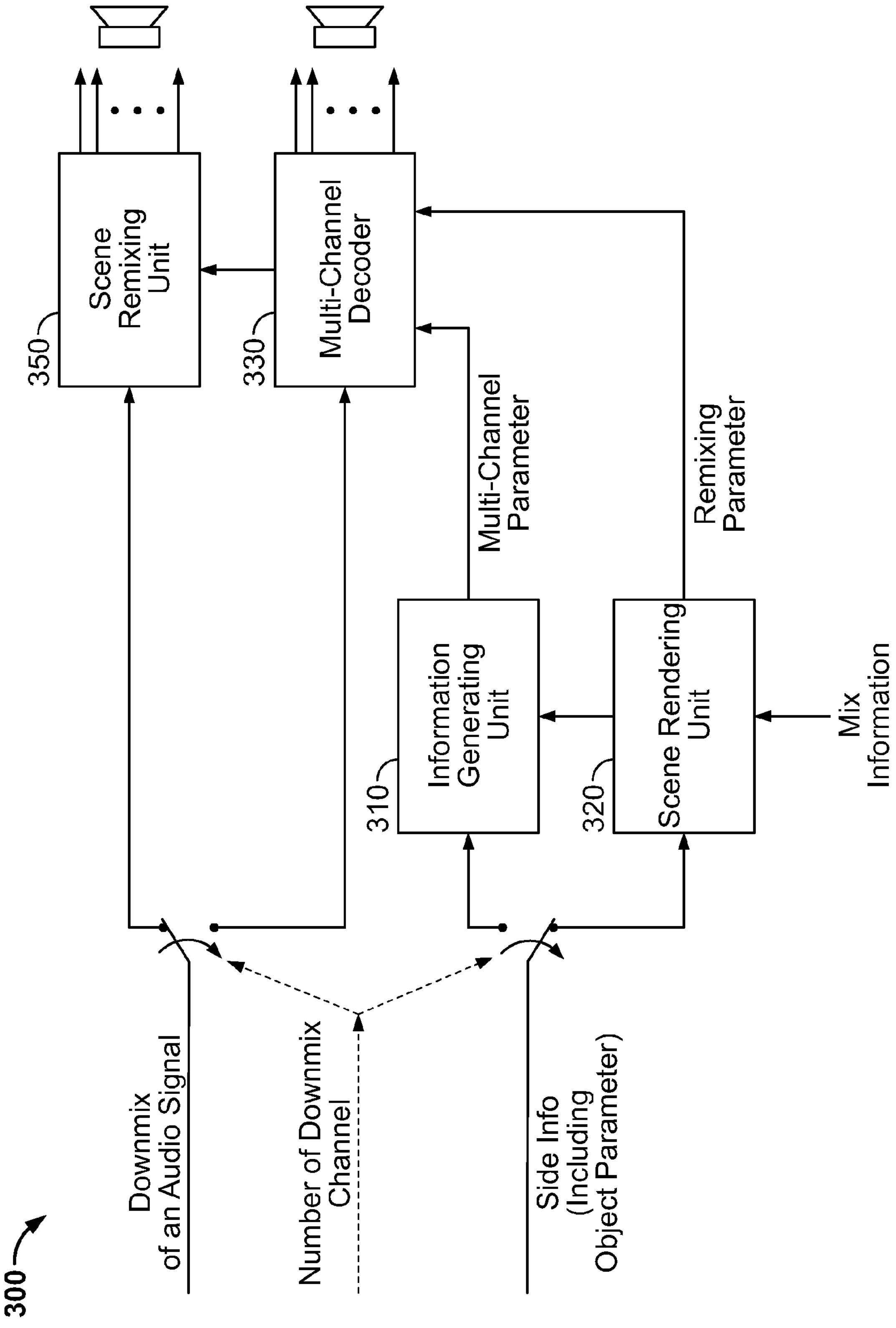
FIG. 3 is an exemplary block diagram of an apparatus for processing an audio signal according to another embodiment of the present invention corresponding to the first scheme.

FIG. 3 is an exemplary block diagram of an apparatus for processing an audio signal according to another embodiment of the present invention corresponding to first scheme. Referring to FIG. 3, an apparatus for processing an audio signal according to another embodiment of the present invention 300 (hereinafter simply a decoder 300) may include a information generating unit 310, a scene rendering unit 320, a multi-channel decoder 330, and a scene remixing unit 350.

The information generating unit 310 can be configured to receive a side information including an object parameter from an encoder if the downmix signal corresponds to mono channel signal (i.e., the number of downmix channel is '1'), may receive a mix information from a user interface, and may generate a multi-channel parameter using the side information and the mix information. The number of downmix channel can be estimated based on a flag information included in the side information as well as the downmix signal itself and user selection. The information generating unit 310 may have the same configuration of the former information generating unit 210. The multi-channel parameter is inputted to the multi-channel decoder 330, the multi-channel decoder 330 may have the same configuration of the former multi-channel decoder 230.

The scene rendering unit 320 can be configured to receive a side information including an object parameter from and encoder if the downmix signal corresponds to non-mono channel signal (i.e., the number of downmix channel is more than '2'), may receive a mix information from a user interface, and may generate a remixing parameter using the side information and the mix information. The remixing parameter corresponds to a parameter in order to remix a stereo channel and generate more than 2-channel outputs. The remixing parameter is inputted to the scene remixing unit 350. The scene remixing unit 350 can be configured to remix the downmix signal using the remixing parameter if the downmix signal is more than 2-channel signal.

In brief, two paths could be considered as separate implementations for separate applications in a decoder 300.

1.2 Modifying a Multi-Channel Decoder

Second scheme may modify a conventional multi-channel decoder. At first, a case of using virtual output for controlling object gains and a case of modifying a device setting for controlling object panning shall be explained with reference to FIG. 4 as follow. Subsequently, a case of Performing TBT (2×2) functionality in a multi-channel decoder shall be explained with reference to FIG. 5.

Figure 4:
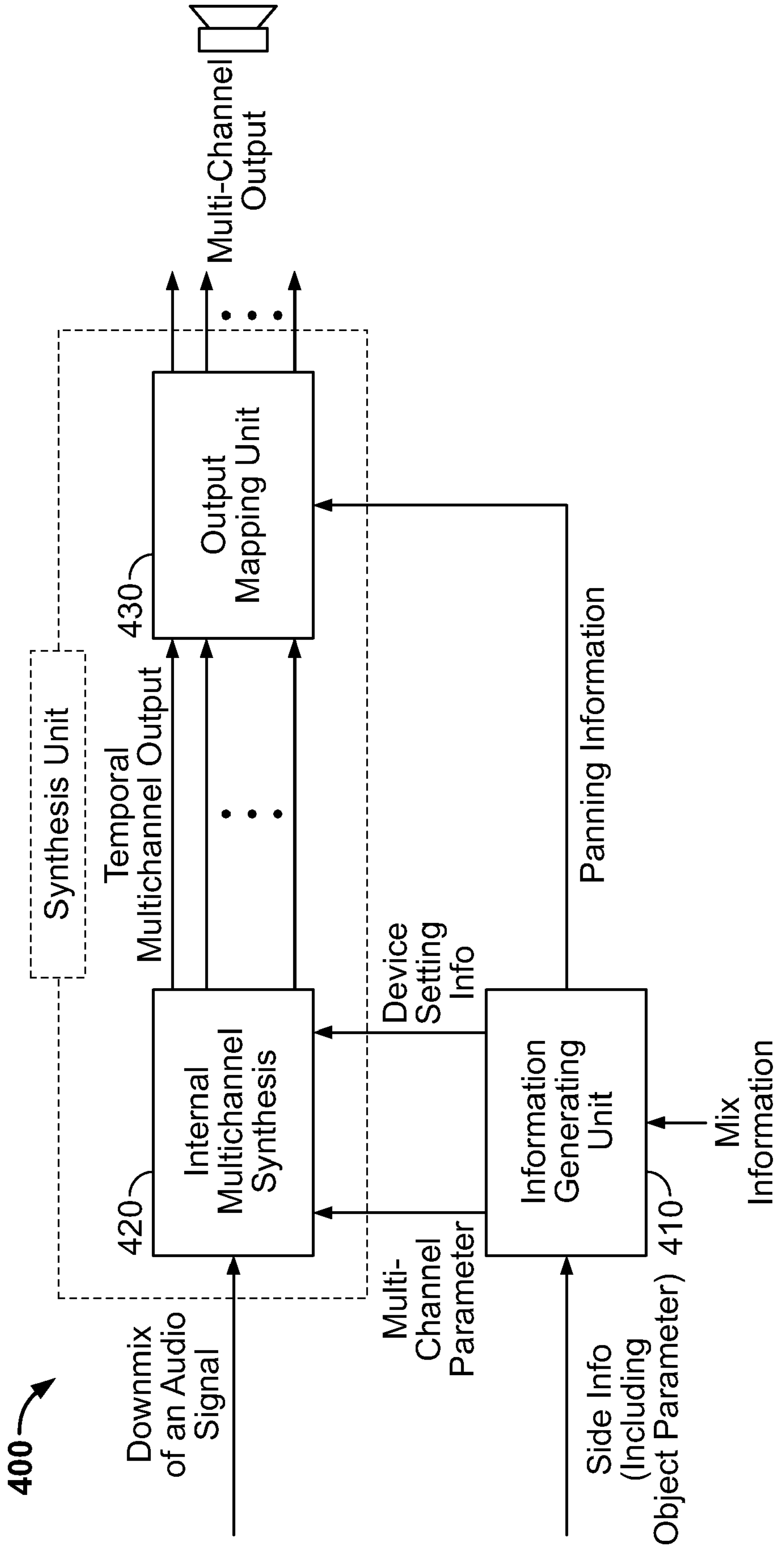
FIG. 4 is an exemplary block diagram of an apparatus for processing an audio signal according to one embodiment of present invention corresponding to the second scheme.

FIG. 4 is an exemplary block diagram of an apparatus for processing an audio signal according to one embodiment of present invention corresponding to the second scheme. Referring to FIG. 4, an apparatus for processing an audio signal according to one embodiment of present invention corresponding to the second scheme 400 (hereinafter simply 'a decoder 400') may include an information generating unit 410, an internal multi-channel synthesis 420, and an output mapping unit 430. The internal multi-channel synthesis 420 and the output mapping unit 430 may be included in a synthesis unit.

The information generating unit 410 can be configured to receive a side information including an object parameter from an encoder, and a mix parameter from a user interface. And the information generating unit 410 can be configured to generate a multi-channel parameter and a device setting information using the side information and the mix information. The multi-channel parameter may have the same configuration of the former multi-channel parameter. So, details of the multi-channel parameter shall be omitted in the following description. The device setting information may correspond to parameterized HRTF for binaural processing, which shall be explained in the description of '1.2.2 Using a device setting information'.

The internal multi-channel synthesis 420 can be configured to receive a multi-channel parameter and a device setting information from the parameter generation unit 410 and downmix signal from an encoder. The internal multi-channel synthesis 420 can be configured to generate a temporal multi-channel output including a virtual output, which shall be explained in the description of '1.2.1 Using a virtual output'.

1.2.1 Using a Virtual Output

Since multi-channel parameter (ex: CLD) can control object panning, it is hard to control object gain as well as object panning by a conventional multi-channel decoder.

Meanwhile, in order to object gain, the decoder 400 (especially the internal multi-channel synthesis 420) may map relative energy of object to a virtual channel (ex: center channel). The relative energy of object corresponds to energy to be reduced. For example, in order to mute certain object, the decoder 400 may map more than 99.9% of object energy to a virtual channel. Then, the decoder 400 (especially, the output mapping unit 430) does not output the virtual channel to which the rest energy of object is mapped. In conclusion, if more than 99.9% of object is mapped to a virtual channel which is not outputted, the desired object can be almost mute.

1.2.2 Using a Device Setting Information

The decoder 400 can adjust a device setting information in order to control object panning and object gain. For example, the decoder can be configured to generate a parameterized HRTF for binaural processing in MPEG Surround standard. The parameterized HRTF can be variable according to device setting. It is able to assume that object signals can be controlled according to the following formula 2.

$$L_{new}=a_1*\mathrm{obj}_1+a_2*\mathrm{obj}_2+a_3*\mathrm{obj}_3+\ldots+a_n*\mathrm{obj}_n,$$

$$R_{new}=b_1*\mathrm{obj}_1+b_2*\mathrm{obj}_2+b_3*\mathrm{obj}_3+\ldots+b_n*\mathrm{obj}_n, \quad \text{[formula 2]}$$

where $\mathrm{obj}_k$ is object signals, $L_{new}$ and $R_{new}$ is a desired stereo signal, and $a_k$ and $b_k$ are coefficients for object control.

An object information of the object signals $\mathrm{obj}_k$ may be estimated from an object parameter included in the transmitted side information. The coefficients $a_k$, $b_k$ which are defined according to object gain and object panning may be estimated from the mix information. The desired object gain and object panning can be adjusted using the coefficients $a_k$, $b_k$.

The coefficients $a_k$, $b_k$ can be set to correspond to HRTF parameter for binaural processing, which shall be explained in details as follow.

In MPEG Surround standard (5-1-$1_1$ configuration) (from ISO/IEC FDIS 23003-1:2006(E), Information Technology—MPEG Audio Technologies—Part1: MPEG Surround), binaural processing is as below.

$$y_B^{n,k}=\begin{bmatrix} y_{L_B}^{n,k} \\ y_{R_B}^{n,k} \end{bmatrix}=H_2^{n,k}\begin{bmatrix} y_m^{n,k} \\ D(y_m^{n,k}) \end{bmatrix}=\begin{bmatrix} h_{11}^{n,k} & h_{12}^{n,k} \\ h_{21}^{n,k} & h_{22}^{n,k} \end{bmatrix}\begin{bmatrix} y_m^{n,k} \\ D(y_m^{n,k}) \end{bmatrix}, \quad 0 \le k < K \quad \text{[formula 3]}$$

where $y_B$ is output, the matrix H is conversion matrix for binaural processing.

$$H_1^{l,m}=\begin{bmatrix} h_{11}^{l,m} & h_{12}^{l,m} \\ h_{21}^{l,m} & -(h_{12}^{l,m})^* \end{bmatrix}, \ 0 \le m < M_{Proc},\ 0 \le l < L \quad \text{[formula 4]}$$

The elements of matrix H is defined as follows:

$$h_{11}^{l,m}=\sigma_L(\cos(IPD_B^{l,m}/2)+j\sin(IPD_B^{l,m}/2))(iid^{l,m}+ICC_B^{l,m})d^{l,m} \quad \text{[formula 5]}$$

$$\begin{aligned}(\sigma_X^{l,m})^2 = {} & (P_{X,C}^m)^2(\sigma_C^{l,m})^2+(P_{X,L}^m)^2(\sigma_L^{l,m})^2+ \\ & (P_{X,Ls}^m)^2(\sigma_{Ls}^{l,m})^2+(P_{X,R}^m)^2(\sigma_R^{l,m})^2+(P_{X,Rs}^m)^2(\sigma_{Rs}^{l,m})^2+\ldots \\ & P_{X,L}^m P_{X,R}^m \rho_L^m \sigma_L^{l,m}\sigma_R^{l,m} ICC_3^{l,m}\cos(\phi_L^m)+\ldots \\ & P_{X,L}^m P_{X,R}^m \rho_R^m \sigma_L^{l,m}\sigma_R^{l,m} ICC_3^{l,m}\cos(\phi_R^m)+\ldots \\ & P_{X,Ls}^m P_{X,Rs}^m \rho_{Ls}^m \sigma_{Ls}^{l,m}\sigma_{Rs}^{l,m} ICC_2^{l,m}\cos(\phi_{Ls}^m)+\ldots \\ & P_{X,Ls}^m P_{X,Rs}^m \rho_{Rs}^m \sigma_{Ls}^{l,m}\sigma_{Rs}^{l,m} ICC_2^{l,m}\cos(\phi_{Rs}^m)\end{aligned} \quad \text{[formula 6]}$$

$$(\sigma_L^{l,m})^2=r_1(CLD_0^{l,m})r_1(CLD_1^{l,m})r_1(CLD_3^{l,m}) \quad \text{[formula 7]}$$

$$(\sigma_R^{l,m})^2=r_1(CLD_0^{l,m})r_1(CLD_1^{l,m})r_2(CLD_3^{l,m})$$

$$(\sigma_C^{l,m})^2=r_1(CLD_0^{l,m})r_2(CLD_1^{l,m})/g_c^2$$

-continued $$(\sigma_{Ls}^{l,m})^2=r_2(CLD_0^{l,m})r_1(CLD_2^{l,m})/g_s^2$$

$$(\sigma_{Rs}^{l,m})^2=r_2(CLD_0^{l,m})r_2(CLD_2^{l,m})/g_s^2$$

with $$r_1(CLD)=\frac{10^{CLD/10}}{1+10^{CLD/10}} \text{ and } r_2(CLD)=\frac{1}{1+10^{CLD/10}}.$$

1.2.3 Performing TBT(2×2) Functionality in a Multi-Channel Decoder

Figure 5:
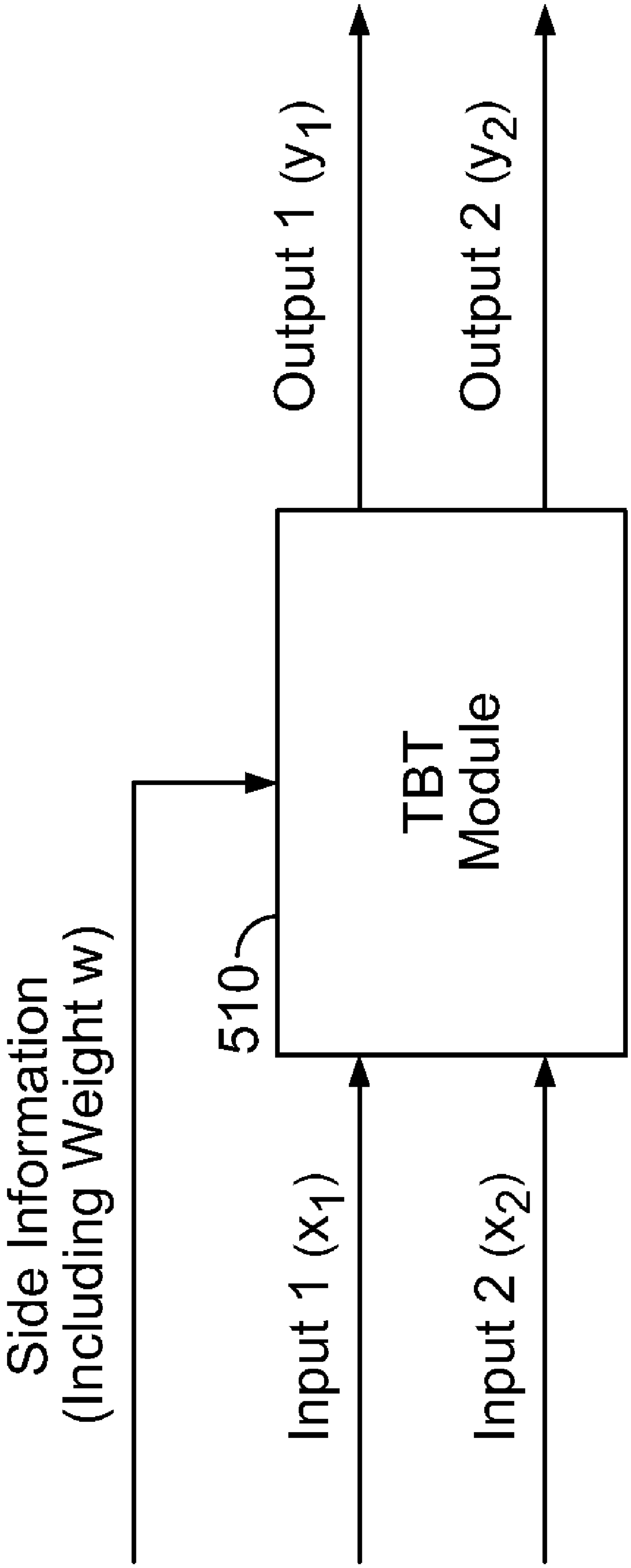
FIG. 5 is an exemplary block diagram of an apparatus for processing an audio signal according to another embodiment of present invention corresponding to the second scheme.

FIG. 5 is an exemplary block diagram of an apparatus for processing an audio signal according to another embodiment of present invention corresponding to the second scheme. FIG. 5 is an exemplary block diagram of TBT functionality in a multi-channel decoder. Referring to FIG. 5, a TBT module 510 can be configured to receive input signals and a TBT control information, and generate output signals. The TBT module 510 may be included in the decoder 200 of the FIG. 2 (or in particular, the multi-channel decoder 230). The multi-channel decoder 230 may be implemented according to the MPEG Surround standard, which does not put limitation on the present invention.

$$y=\begin{bmatrix} y_1 \\ y_2 \end{bmatrix}=\begin{bmatrix} w_{11} & w_{12} \\ w_{21} & w_{22} \end{bmatrix}\begin{bmatrix} x_1 \\ x_2 \end{bmatrix}=Wx \quad \text{[formula 9]}$$

where x is input channels, y is output channels, and w is weight.

The output $y_1$ may correspond to a combination input $x_1$ of the downmix multiplied by a first gain $w_{11}$ and input $x_2$ multiplied by a second gain $w_{12}$.

The TBT control information inputted in the TBT module 510 includes elements which can compose the weight w ($w_{11}$, $w_{12}$, $w_{21}$, $w_{22}$).

In MPEG Surround standard, OTT(One-To-Two) module and TTT(Two-To-Three) module is not proper to remix input signal although OTT module and TTT module can upmix the input signal.

In order to remix the input signal, TBT (2×2) module 510 (hereinafter abbreviated 'TBT module 510') may be provided. The TBT module 510 may can be figured to receive a stereo signal and output the remixed stereo signal. The weight w may be composed using CLD(s) and ICC(s).

If the weight term $w_{11}$~$w_{22}$ is transmitted as a TBT control information, the decoder may control object gain as well as object panning using the received weight term. In transmitting the weight term w, variable scheme may be provided. At first, a TBT control information includes cross term like the $w_{12}$ and $w_{21}$. Secondly, a TBT control information does not include the cross term like the $w_{12}$ and $w_{21}$. Thirdly, the number of the term as a TBT control information varies adaptively.

At first, there is need to receive the cross term like the $w_{12}$ and $w_{21}$ in order to control object panning as left signal of input channel go to right of the output channel. In case of N input channels and M output channels, the terms which number is N×M may be transmitted as TBT control information. The terms can be quantized based on a CLD parameter quantization table introduced in a MPEG Surround, which does not put limitation on the present invention.

Secondly, unless left object is shifted to right position, (i.e. when left object is moved to more left position or left position adjacent to center position, or when only level of the object is adjusted), there is no need to use the cross term. In the case, it is proper that the term except for the cross term is transmitted. In case of N input channels and M output channels, the terms which number is just N may be transmitted.

Thirdly, the number of the TBT control information varies adaptively according to need of cross term in order to reduce the bit rate of a TBT control information. A flag information 'cross_flag' indicating whether the cross term is present or not is set to be transmitted as a TBT control information. Meaning of the flag information 'cross_flag' is shown in the following table 1.

TABLE 1

| meaning of cross_flag | |
|---|---|
| cross_flag | meaning |
| 0 | no cross term (includes only non-cross term) (only $w_{11}$ and $w_{22}$ are present) |
| 1 | includes cross term ($w_{11}$, $w_{12}$, $w_{21}$, and $w_{22}$ are present) |

In case that 'cross_flag' is equal to 0, the TBT control information does not include the cross term, only the non-cross term like the $w_{11}$ and $w_{22}$ is present. Otherwise ('cross_flag' is equal to 1), the TBT control information includes the cross term.

Besides, a flag information 'reverse_flag' indicating whether cross term is present or non-cross term is present is set to be transmitted as a TBT control information. Meaning of flag information 'reverse_flag' is shown in the following table 2.

TABLE 2

| meaning of reverse_flag | |
|---|---|
| reverse_flag | meaning |
| 0 | no cross term (includes only non-cross term) (only $w_{11}$ and $w_{22}$ are present) |
| 1 | only cross term (only $w_{12}$ and $w_{21}$ are present) |

In case that 'reverse_flag' is equal to 0, the TBT control information does not include the cross term, only the non-cross term like the $w_{11}$ and $w_{22}$ is present. Otherwise ('reverse_flag' is equal to 1), the TBT control information includes only the cross term.

Furthermore, a flag information 'side_flag' indicating whether cross term is present and non-cross is present is set to be transmitted as a TBT control information. Meaning of flag information 'side_flag' is shown in the following table 3.

TABLE 3

| meaning of side_config | |
|---|---|
| side_config | meaning |
| 0 | no cross term (includes only non-cross term) (only $w_{11}$ and $w_{22}$ are present) |
| 1 | includes cross term ($w_{11}$, $w_{12}$, $w_{21}$, and $w_{22}$ are present) |
| 2 | reverse (only $w_{12}$ and $w_{21}$ are present) |

Since the table 3 corresponds to combination of the table 1 and the table 2, details of the table 3 shall be omitted.

1.2.4 Performing TBT(2×2) Functionality in a Multi-Channel Decoder by Modifying a Binaural Decoder The case of '1.2.2 Using a device setting information' can be performed without modifying the binaural decoder. Hereinafter, performing TBT functionality by modifying a binaural decoder employed in a MPEG Surround decoder, with reference to FIG. 6.

Figure 6:
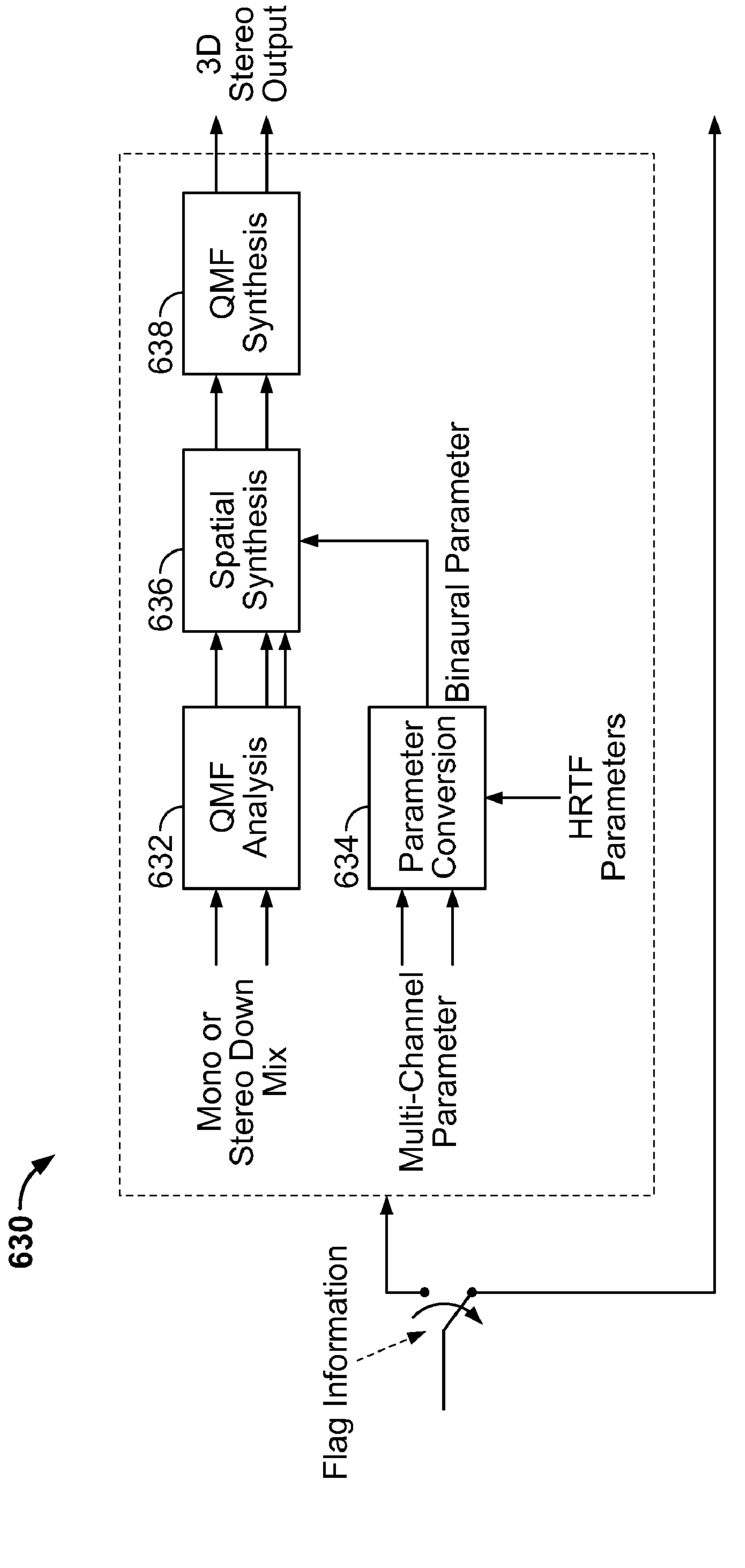
FIG. 6 is an exemplary block diagram of an apparatus for processing an audio signal according to the other embodiment of present invention corresponding to the second scheme.

FIG. 6 is an exemplary block diagram of an apparatus for processing an audio signal according to the other embodiment of present invention corresponding to the second scheme. In particular, an apparatus for processing an audio signal 630 shown in the FIG. 6 may correspond to a binaural decoder included in the multi-channel decoder 230 of FIG. 2 or the synthesis unit of FIG. 4, which does not put limitation on the present invention.

An apparatus for processing an audio signal 630 (hereinafter 'a binaural decoder 630') may include a QMF analysis 632, a parameter conversion 634, a spatial synthesis 636, and a QMF synthesis 638. Elements of the binaural decoder 630 may have the same configuration of MPEG Surround binaural decoder in MPEG Surround standard. For example, the spatial synthesis 636 can be configured to consist of 1 2×2 (filter) matrix, according to the following formula 10:

$$y_B^{n,k} = \begin{bmatrix} y_{L_B}^{n,k} \\ y_{R_B}^{n,k} \end{bmatrix} = \sum_{i=0}^{N_q-1} H_2^{n-i,k} y_0^{n-i,k} = \sum_{i=0}^{N_q-1} \begin{bmatrix} h_{11}^{n-i,k} & h_{12}^{n-i,k} \\ h_{21}^{n-i,k} & h_{22}^{n-i,k} \end{bmatrix} \begin{bmatrix} y_{L_0}^{n-i,k} \\ y_{R_0}^{n-i,k} \end{bmatrix}, 0 \le k < K \quad \text{[formula 10]}$$

with $y_0$ being the QMF-domain input channels and $y_B$ being the binaural output channels, k represents the hybrid QMF channel index, and i is the HRTF filter tap index, and n is the QMF slot index. The binaural decoder 630 can be configured to perform the above-mentioned functionality described in subclause '1.2.2 Using a device setting information'. However, the elements $h_{ij}$ may be generated using a multi-channel parameter and a mix information instead of a multi-channel parameter and HRTF parameter. In this case, the binaural decoder 600 can perform the functionality of the TBT module 510 in the FIG. 5. Details of the elements of the binaural decoder 630 shall be omitted.

The binaural decoder 630 can be operated according to a flag information 'binaural_flag'. In particular, the binaural decoder 630 can be skipped in case that a flag information binaural_flag is '0', otherwise (the binaural_flag is '1'), the binaural decoder 630 can be operated as below.

TABLE 4

| meaning of binaural_flag | |
|---|---|
| binaural_flag | Meaning |
| 0 | not binaural mode (a binaural decoder is deactivated) |
| 1 | binaural mode (a binaural decoder is activated) |

1.3 Processing Downmix of Audio Signals Before being Inputted to a Multi-Channel Decoder The first scheme of using a conventional multi-channel decoder have been explained in subclause in '1.1', the second scheme of modifying a multi-channel decoder have been explained in subclause in '1.2'. The third scheme of processing downmix of audio signals before being inputted to a multi-channel decoder shall be explained as follow.

Figure 7:
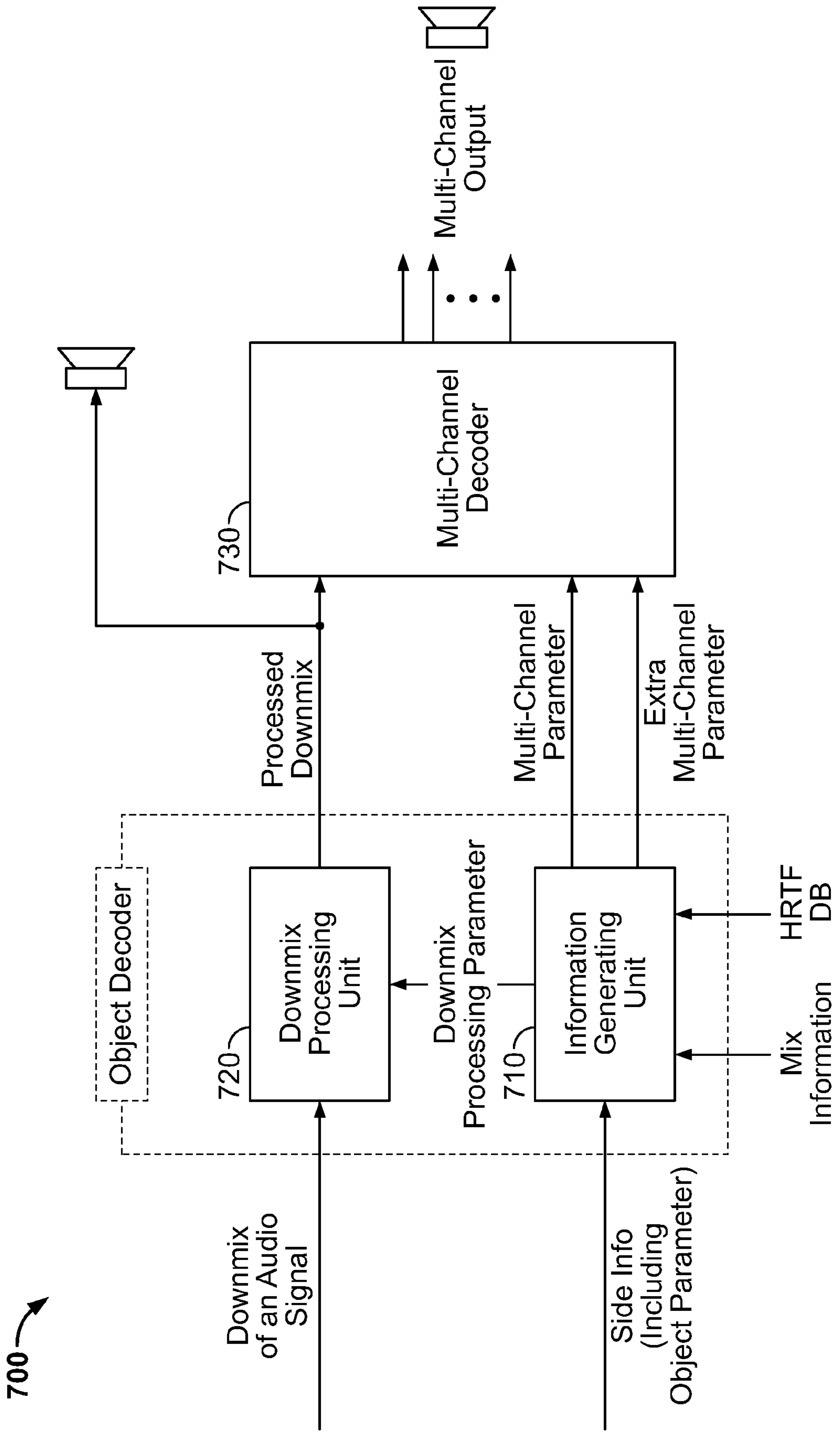
FIG. 7 is an exemplary block diagram of an apparatus for processing an audio signal according to one embodiment of the present invention corresponding to the third scheme.
Figure 8:
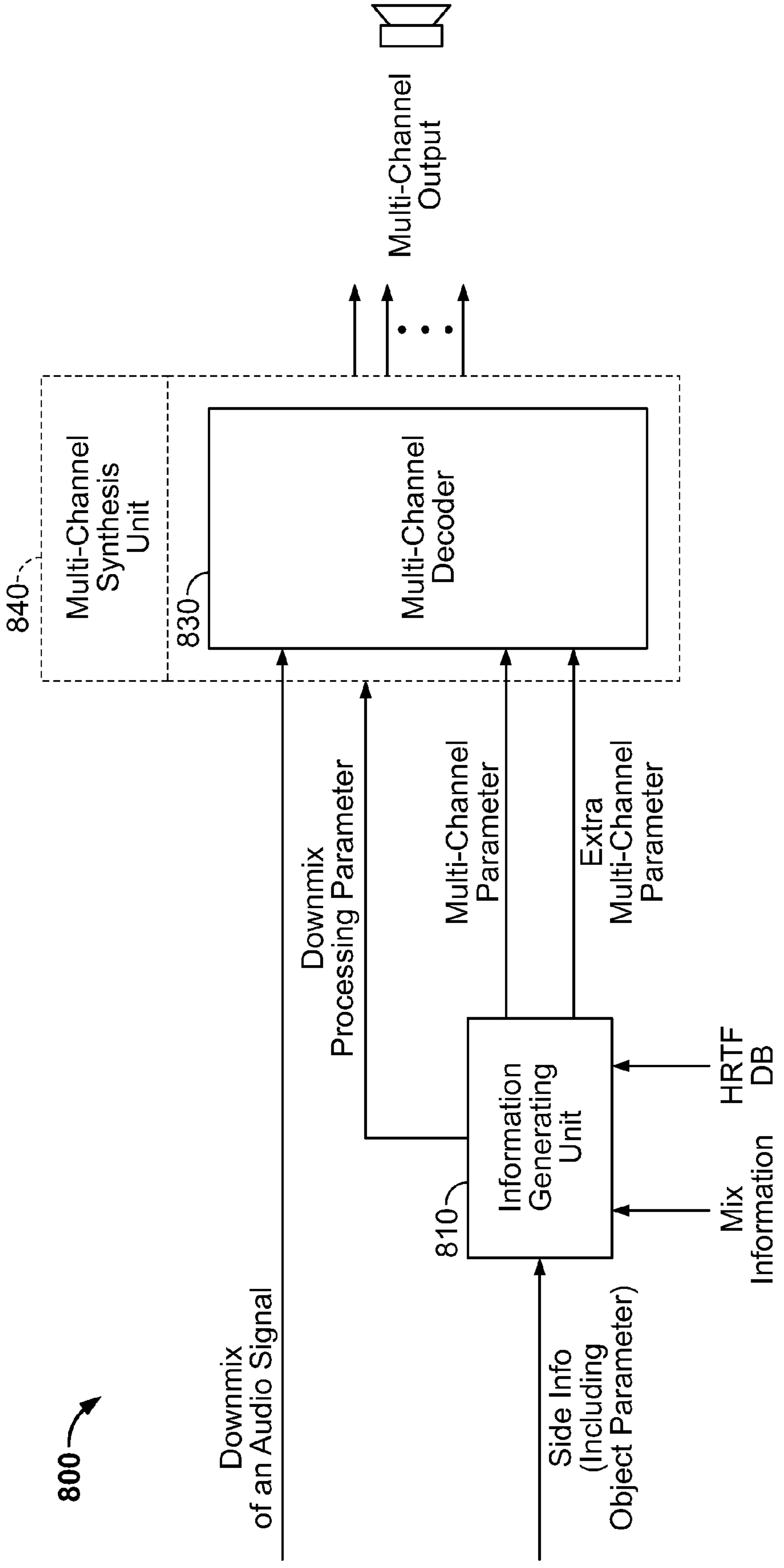
FIG. 8 is an exemplary block diagram of an apparatus for processing an audio signal according to another embodiment of the present invention corresponding to the third scheme.

FIG. 7 is an exemplary block diagram of an apparatus for processing an audio signal according to one embodiment of the present invention corresponding to the third scheme. FIG. 8 is an exemplary block diagram of an apparatus for processing an audio signal according to another embodiment of the present invention corresponding to the third scheme. At first, Referring to FIG. 7, an apparatus for processing an audio signal 700 (hereinafter simply 'a decoder 700') may include an information generating unit 710, a downmix processing unit 720, and a multi-channel decoder 730. Referring to FIG. 8, an apparatus for processing an audio signal 800 (hereinafter simply 'a decoder 800') may include an information generating unit 810 and a multi-channel synthesis unit 840 having a multi-channel decoder 830. The decoder 800 may be another aspect of the decoder 700. In other words, the information generating unit 810 has the same configuration of the information generating unit 710, the multi-channel decoder 830 has the same configuration of the multi-channel decoder 730, and, the multi-channel synthesis unit 840 may has the same configuration of the downmix processing unit 720 and multi-channel unit 730. Therefore, elements of the decoder 700 shall be explained in details, but details of elements of the decoder 800 shall be omitted.

The information generating unit 710 can be configured to receive a side information including an object parameter from an encoder and a mix information from an user-interface, and to generate a multi-channel parameter to be outputted to the multi-channel decoder 730. From this point of view, the information generating unit 710 has the same configuration of the former information generating unit 210 of FIG. 2. The downmix processing parameter may correspond to a parameter for controlling object gain and object panning. For example, it is able to change either the object position or the object gain in case that the object signal is located at both left channel and right channel. It is also able to render the object signal to be located at opposite position in case that the object signal is located at only one of left channel and right channel. In order that these cases are performed, the downmix processing unit 720 can be a TBT module (2×2 matrix operation). In case that the information generating unit 710 can be configured to generate ADG described with reference to FIG. 2. in order to control object gain, the downmix processing parameter may include parameter for controlling object panning but object gain.

Furthermore, the information generating unit 710 can be configured to receive HRTF information from HRTF database, and to generate an extra multi-channel parameter including a HRTF parameter to be inputted to the multi-channel decoder 730. In this case, the information generating unit 710 may generate multi-channel parameter and extra multi-channel parameter in the same subband domain and transmit in synchronization with each other to the multi-channel decoder 730. The extra multi-channel parameter including the HRTF parameter shall be explained in details in subclause '3. Processing Binaural Mode'.

The downmix processing unit 720 can be configured to receive downmix of an audio signal from an encoder and the downmix processing parameter from the information generating unit 710, and to decompose a subband domain signal using subband analysis filter bank. The downmix processing unit 720 can be configured to generate the processed downmix signal using the downmix signal and the downmix processing parameter. In these processing, it is able to pre-process the downmix signal in order to control object panning and object gain. The processed downmix signal may be inputted to the multi-channel decoder 730 to be upmixed.

Furthermore, the processed downmix signal may be output and played back via speaker as well. In order to directly output the processed signal via speakers, the downmix processing unit 720 may perform synthesis filterbank using the processed subband domain signal and output a time-domain PCM signal. It is able to select whether to directly output as PCM signal or input to the multi-channel decoder by user selection.

The multi-channel decoder 730 can be configured to generate multi-channel output signal using the processed downmix and the multi-channel parameter. The multi-channel decoder 730 may introduce a delay when the processed downmix signal and the multi-channel parameter are inputted in the multi-channel decoder 730. The processed downmix signal can be synthesized in frequency domain (ex: QMF domain, hybrid QMF domain, etc), and the multi-channel parameter can be synthesized in time domain. In MPEG surround standard, delay and synchronization for connecting HE-AAC is introduced. Therefore, the multi-channel decoder 730 may introduce the delay according to MPEG Surround standard.

The configuration of downmix processing unit 720 shall be explained in detail with reference to FIG. 9~FIG. 13.

1.3.1 A General Case and Special Cases of Downmix Processing Unit

Figure 9:
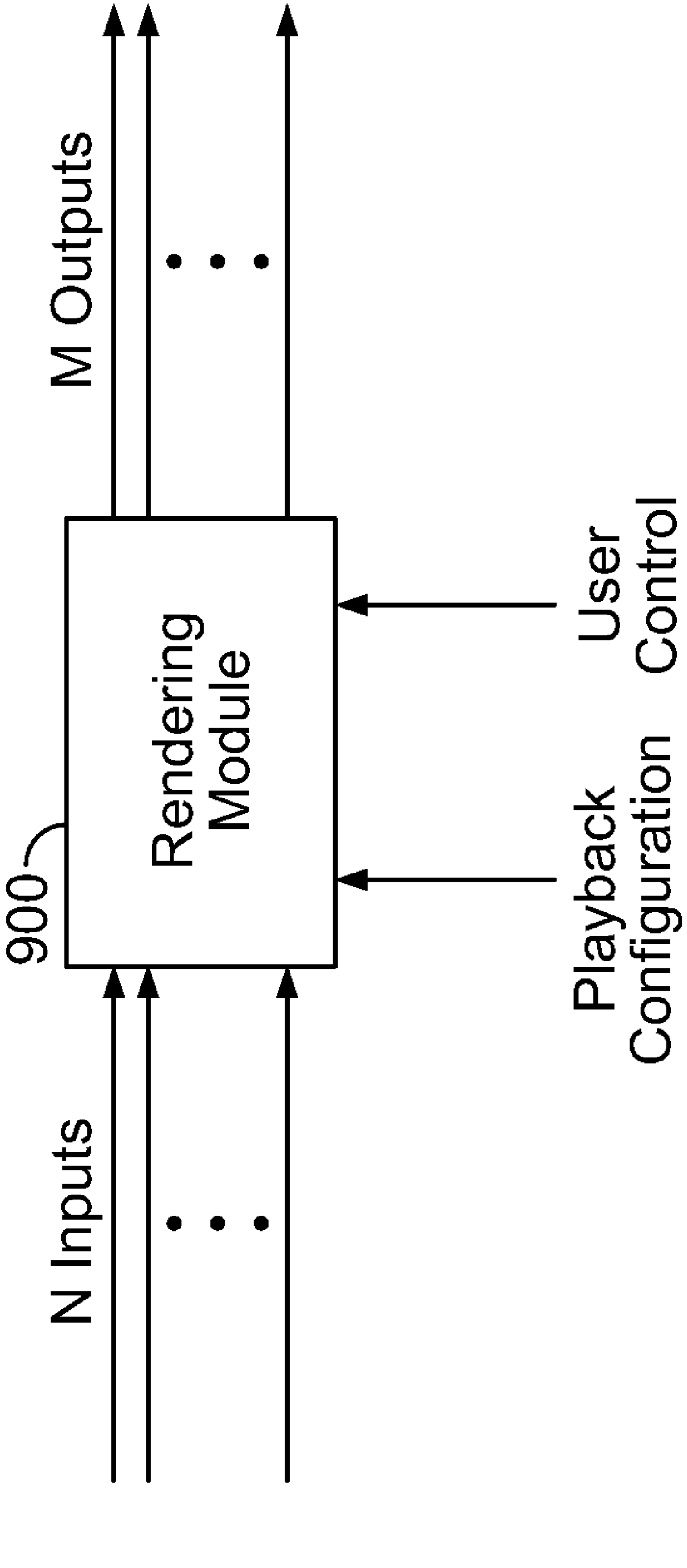
FIG. 9 is an exemplary block diagram to explain to basic concept of rendering unit.

FIG. 9 is an exemplary block diagram to explain to basic concept of rendering unit. Referring to FIG. 9, a rendering module 900 can be configured to generate M output signals using N input signals, a playback configuration, and a user control. The N input signals may correspond to either object signals or channel signals. Furthermore, the N input signals may correspond to either object parameter or multi-channel parameter. Configuration of the rendering module 900 can be implemented in one of downmix processing unit 720 of FIG. 7, the former rendering unit 120 of FIG. 1, and the former renderer 110*a* of FIG. 1, which does not put limitation on the present invention.

If the rendering module 900 can be configured to directly generate M channel signals using N object signals without summing individual object signals corresponding certain channel, the configuration of the rendering module 900 can be represented the following formula 11.

$$C = RO \qquad \text{[formula 11]}$$

$$\begin{bmatrix} C_1 \\ C_2 \\ \vdots \\ C_M \end{bmatrix} = \begin{bmatrix} R_{11} & R_{21} & \cdots & R_{N1} \\ R_{12} & R_{22} & \cdots & R_{N2} \\ \vdots & \vdots & \ddots & \vdots \\ R_{1M} & R_{2M} & \cdots & R_{NM} \end{bmatrix} \begin{bmatrix} O_1 \\ O_2 \\ \vdots \\ O_N \end{bmatrix}$$

Ci is a $i^{th}$ channel signal, $O_j$ is $j^{th}$ input signal, and $R_{ji}$ is a matrix mapping $j^{th}$ input signal to $i^{th}$ channel.

If R matrix is separated into energy component E and de-correlation component, the formula 11 may be represented as follow.

$$C = RO = EO + DO \quad \text{[formula 12]}$$

$$\begin{bmatrix} C_1 \\ C_2 \\ \vdots \\ C_M \end{bmatrix} = \begin{bmatrix} E_{11} & E_{21} & \cdots & E_{N1} \\ E_{12} & E_{22} & \cdots & E_{N2} \\ \vdots & \vdots & \ddots & \vdots \\ E_{1M} & E_{2M} & \cdots & E_{NM} \end{bmatrix} \begin{bmatrix} O_1 \\ O_2 \\ \vdots \\ O_N \end{bmatrix} + \begin{bmatrix} D_{11} & D_{21} & \cdots & D_{N1} \\ D_{12} & D_{22} & \cdots & D_{N2} \\ \vdots & \vdots & \ddots & \vdots \\ D_{1M} & D_{2M} & \cdots & D_{NM} \end{bmatrix} \begin{bmatrix} O_1 \\ O_2 \\ \vdots \\ O_N \end{bmatrix}$$

It is able to control object positions using the energy component E, and it is able to control object diffuseness using the de-correlation component D.

Assuming that only $i^{th}$ input signal is inputted to be outputted via $j^{th}$ channel and $k^{th}$ channel, the formula 12 may be represented as follow.

$$C_{jk\_i} = R_i O_i \quad \text{[formula 13]}$$

$$\begin{bmatrix} C_{j\_i} \\ C_{k\_i} \end{bmatrix} = \begin{bmatrix} \alpha_{j\_i}\cos(\theta_{j\_i}) & \alpha_{j\_i}\sin(\theta_{j\_i}) \\ \beta_{k\_i}\cos(\theta_{k\_i}) & \beta_{k\_i}\sin(\theta_{k\_i}) \end{bmatrix} \begin{bmatrix} o_i \\ D(o_i) \end{bmatrix}$$

$\alpha_{i\_j}$ is gain portion mapped to $j^{th}$ channel, $\beta_{k\_i}$ is gain portion mapped to $k^{th}$ channel, $\theta$ is diffuseness level, and $D(o_i)$ is de-correlated output.

Assuming that de-correlation is omitted, the formula 13 may be simplified as follow.

$$C_{jk\_i} = R_i O_i \quad \text{[formula 14]}$$

$$\begin{bmatrix} C_{j\_i} \\ C_{k\_i} \end{bmatrix} = \begin{bmatrix} \alpha_{j\_i}\cos(\theta_{j\_i}) \\ \beta_{k\_i}\cos(\theta_{k\_i}) \end{bmatrix} o_i$$

If weight values for all inputs mapped to certain channel are estimated according to the above-stated method, it is able to obtain weight values for each channel by the following method.

1) Summing weight values for all inputs mapped to certain channel. For example, in case that input 1 $O_1$ and input 2 $O_2$ is inputted and output channel corresponds to left channel L, center channel C, and right channel R, a total weight values $\alpha_{L(tot)}$, $\alpha_{C(tot)}$, $\alpha_{R(tot)}$ may be obtained as follows:

$$\alpha_{L(tot)} = \alpha_{L1}$$

$$\alpha_{C(tot)} = \alpha_{C1} + \alpha_{C2}$$

$$\alpha_{R(tot)} = \alpha_{R2} \quad \text{[formula 15]}$$

where $\alpha_{L1}$ is a weight value for input 1 mapped to left channel L, $\alpha_{C1}$ is a weight value for input 1 mapped to center channel C, $\alpha_{C2}$ is a weight value for input 2 mapped to center channel C, and $\alpha_{R2}$ is a weight value for input 2 mapped to right channel R.

In this case, only input 1 is mapped to left channel, only input 2 is mapped to right channel, input 1 and input 2 is mapped to center channel together.

2) Summing weight values for all inputs mapped to certain channel, then dividing the sum into the most dominant channel pair, and mapping de-correlated signal to the other channel for surround effect. In this case, the dominant channel pair may correspond to left channel and center channel in case that certain input is positioned at point between left and center.
3) Estimating weight value of the most dominant channel, giving attenuated correlated signal to the other channel, which value is a relative value of the estimated weight value.
4) Using weight values for each channel pair, combining the de-correlated signal properly, then setting to a side information for each channel.

Figure 10A:
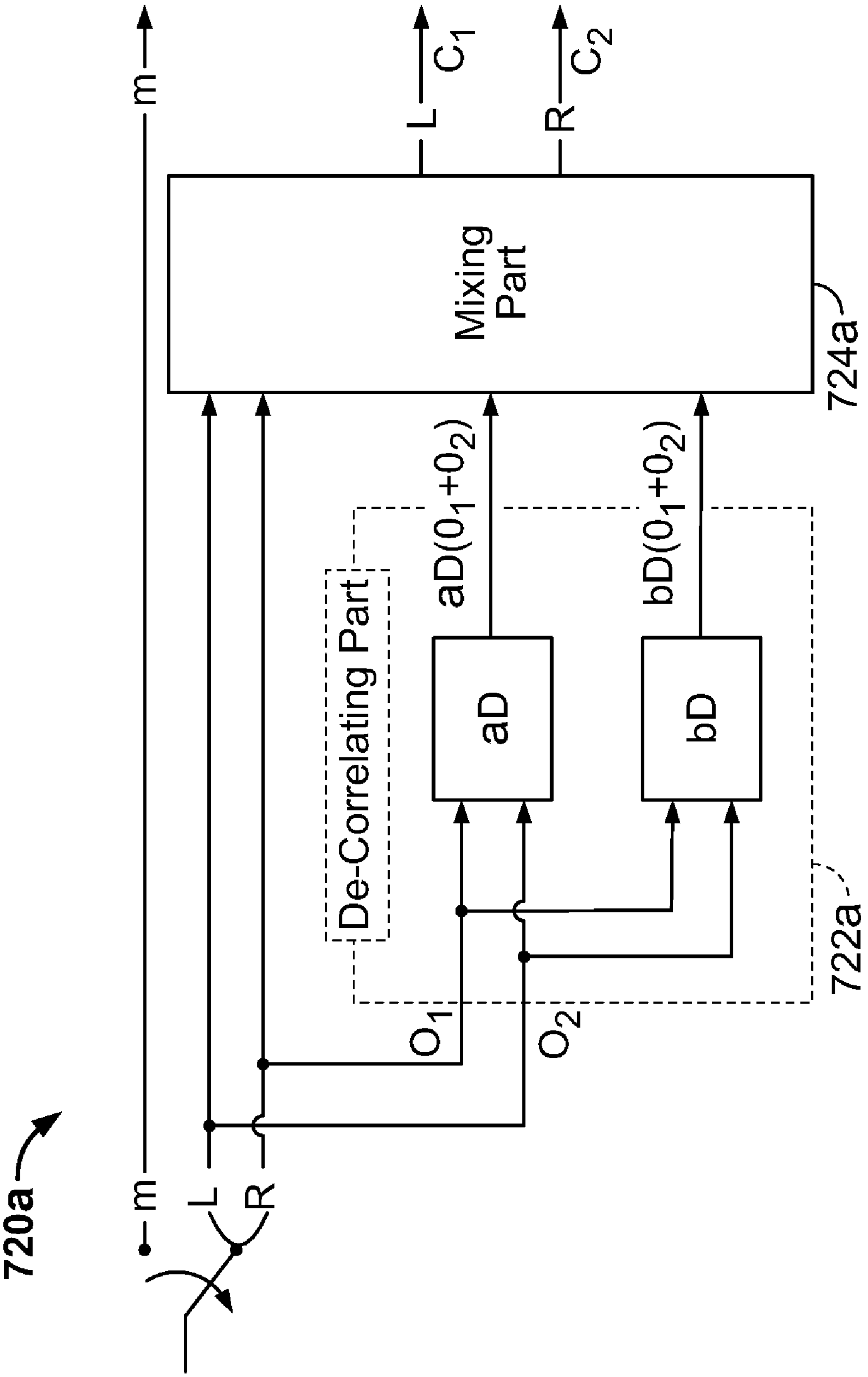
FIGS. 10A to 10C are exemplary block diagrams of a first embodiment of a downmix processing unit illustrated in FIG. 7.
Figure 10B:
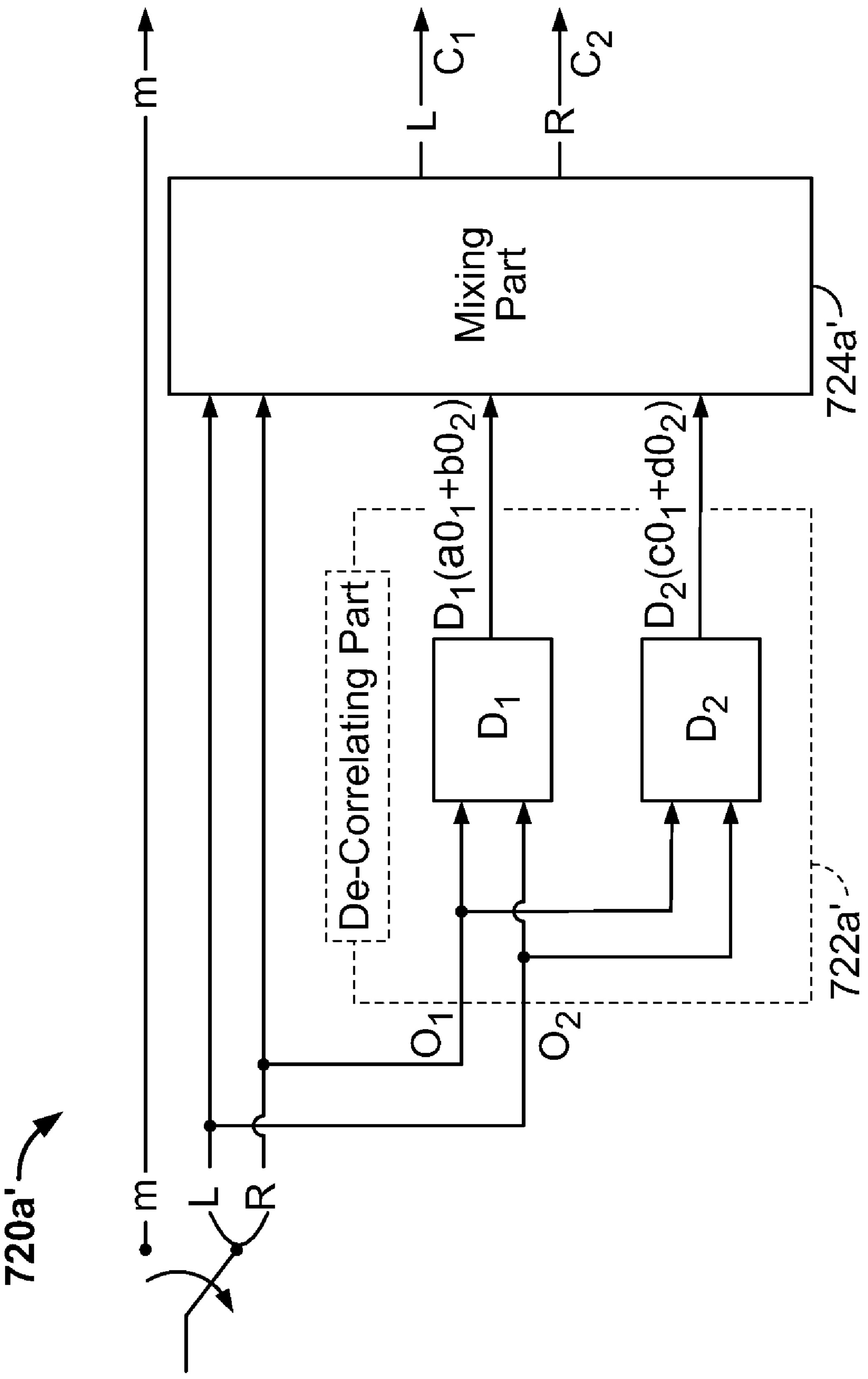
Figure 10C:
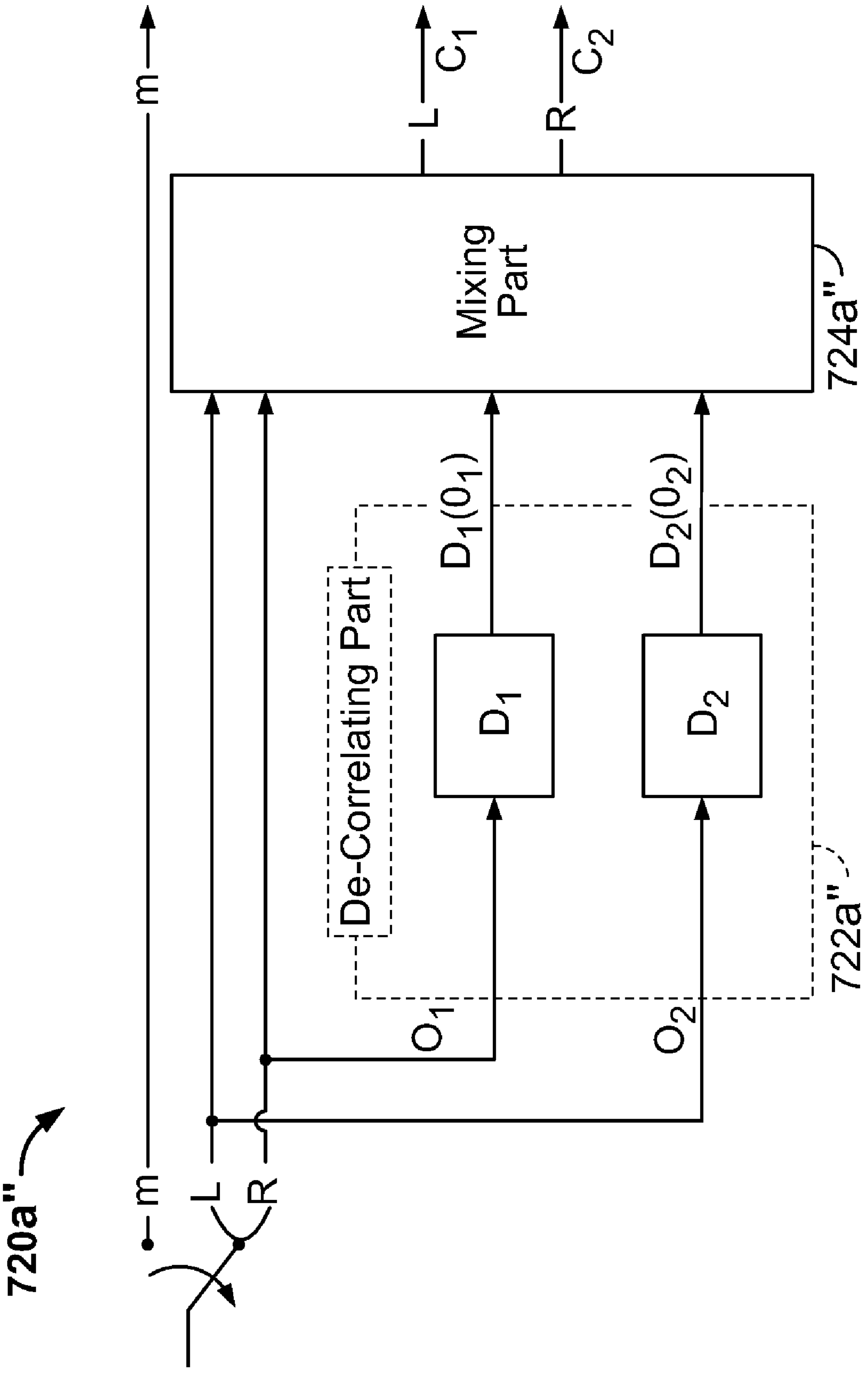

1.3.2 a Case that Downmix Processing Unit Includes a Mixing Part Corresponding to 2×4 Matrix FIGS. 10A to 10C are exemplary block diagrams of a first embodiment of a downmix processing unit illustrated in FIG. 7. As previously stated, a first embodiment of a downmix processing unit 720*a* (hereinafter simply 'a downmix processing unit 720*a*') may be implementation of rendering module 900.

First of all, assuming that $D_{11}=D_{21}=aD$ and $D_{12}=D_{22}=bD$, the formula 12 is simplified as follow.

$$\begin{bmatrix} C_1 \\ C_2 \end{bmatrix} = \begin{bmatrix} E_{11} & E_{21} \\ E_{12} & E_{22} \end{bmatrix} \begin{bmatrix} O_1 \\ O_2 \end{bmatrix} + \begin{bmatrix} aD & aD \\ bD & bD \end{bmatrix} \begin{bmatrix} O_1 \\ O_2 \end{bmatrix} \quad \text{[formula 15]}$$

The downmix processing unit according to the formula 15 is illustrated FIG. 10A. Referring to FIG. 10A, a downmix processing unit 720*a* can be configured to bypass input signal in case of mono input signal (m), and to process input signal in case of stereo input signal (L, R). The downmix processing unit 720*a* may include a de-correlating part 722*a* and a mixing part 724*a*. The de-correlating part 722*a* has a de-correlator aD and de-correlator bD which can be configured to de-correlate input signal. The de-correlating part 722*a* may correspond to a 2×2 matrix. The mixing part 724*a* can be configured to map input signal and the de-correlated signal to each channel. The mixing part 724*a* may correspond to a 2×4 matrix.

Secondly, assuming that $D_{11}=aD_1$, $D_{21}=bD_1$, $D_{12}=cD_2$, and $D_{22}=dD_2$, the formula 12 is simplified as follow.

$$\begin{bmatrix} C_1 \\ C_2 \end{bmatrix} = \begin{bmatrix} E_{11} & E_{21} \\ E_{12} & E_{22} \end{bmatrix} \begin{bmatrix} O_1 \\ O_2 \end{bmatrix} + \begin{bmatrix} aD_1 & bD_1 \\ cD_2 & dD_2 \end{bmatrix} \begin{bmatrix} O_1 \\ O_2 \end{bmatrix} \quad \text{[formula 15-2]}$$

The downmix processing unit according to the formula 15 is illustrated FIG. 10B. Referring to FIG. 10B, a de-correlating part 722' including two de-correlators $D_1$, $D_2$ can be configured to generate de-correlated signals $D_1(a*O_1+b*O_2)$, $D_2(c*O_1+d*O_2)$.

Thirdly, assuming that $D_{11}=D_1$, $D_{21}=0$, $D_{12}=0$, and $D_{22}=D_2$, the formula 12 is simplified as follow.

$$\begin{bmatrix} C_1 \\ C_2 \end{bmatrix} = \begin{bmatrix} E_{11} & E_{21} \\ E_{12} & E_{22} \end{bmatrix} \begin{bmatrix} O_1 \\ O_2 \end{bmatrix} + \begin{bmatrix} D_1 & 0 \\ 0 & D_2 \end{bmatrix} \begin{bmatrix} O_1 \\ O_2 \end{bmatrix} \quad \text{[formula 15-3]}$$

The downmix processing unit according to the formula 15 is illustrated FIG. 10C. Referring to FIG. 10C, a de-correlating part 722" including two de-correlators $D_1$, $D_2$ can be configured to generate de-correlated signals $D_1(O_1)$, $D_2(O_2)$.

1.3.2 a Case that Downmix Processing Unit Includes a Mixing Part Corresponding to 2×3 Matrix The foregoing formula 15 can be represented as follow:

$$\begin{bmatrix} C_1 \\ C_2 \end{bmatrix} = \begin{bmatrix} E_{11} & E_{21} \\ E_{12} & E_{22} \end{bmatrix}\begin{bmatrix} O_1 \\ O_2 \end{bmatrix} + \begin{bmatrix} aD(O_1+O_2) \\ bD(O_1+O_2) \end{bmatrix} = \begin{bmatrix} E_{11} & E_{21} & \alpha \\ E_{12} & E_{22} & \beta \end{bmatrix}\begin{bmatrix} O_1 \\ O_2 \\ D(O_1+O_2) \end{bmatrix}$$ [formula 16]

The matrix R is a 2×3 matrix, the matrix O is a 3×1 matrix, and the C is a 2×1 matrix.

Figure 11:
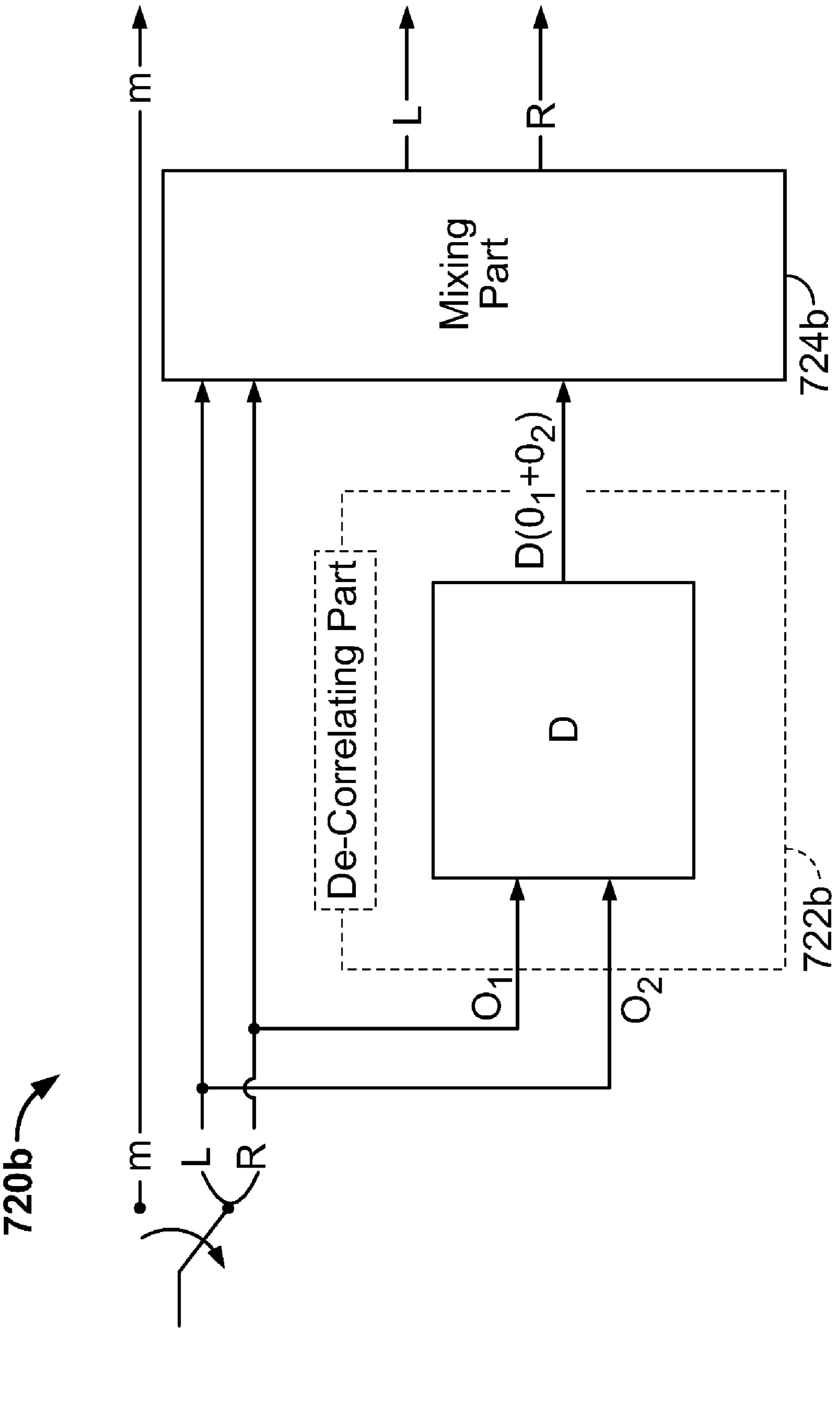
FIG. 11 is an exemplary block diagram of a second embodiment of a downmix processing unit illustrated in FIG. 7.

FIG. 11 is an exemplary block diagram of a second embodiment of a downmix processing unit illustrated in FIG. 7. As previously stated, a second embodiment of a downmix processing unit 720*b* (hereinafter simply 'a downmix processing unit 720*b*') may be implementation of rendering module 900 like the downmix processing unit 720*a*. Referring to FIG. 11, a downmix processing unit 720*b* can be configured to skip input signal in case of mono input signal (m), and to process input signal in case of stereo input signal (L, R). The downmix processing unit 720*b* may include a de-correlating part 722*b* and a mixing part 724*b*. The de-correlating part 722*b* has a de-correlator D which can be configured to de-correlate input signal $O_1$, $O_2$ and output the de-correlated signal $D(O_1+O_2)$. The de-correlating part 722*b* may correspond to a 1×2 matrix. The mixing part 724*b* can be configured to map input signal and the de-correlated signal to each channel. The mixing part 724*b* may correspond to a 2×3 matrix which can be shown as a matrix R in the formula 16.

Furthermore, the de-correlating part 722*b* can be configured to de-correlate a difference signal $O_1$-$O_2$ as common signal of two input signal $O_1$, $O_2$. The mixing part 724*b* can be configured to map input signal and the de-correlated common signal to each channel.

1.3.3 a Case that Downmix Processing Unit Includes a Mixing Part with Several Matrixes Certain object signal can be audible as a similar impression anywhere without being positioned at a specified position, which may be called as a 'spatial sound signal'. For example, applause or noises of a concert hall can be an example of the spatial sound signal. The spatial sound signal needs to be playback via all speakers. If the spatial sound signal playbacks as the same signal via all speakers, it is hard to feel spatialness of the signal because of high inter-correlation (IC) of the signal. Hence, there's need to add correlated signal to the signal of each channel signal.

Figure 12:
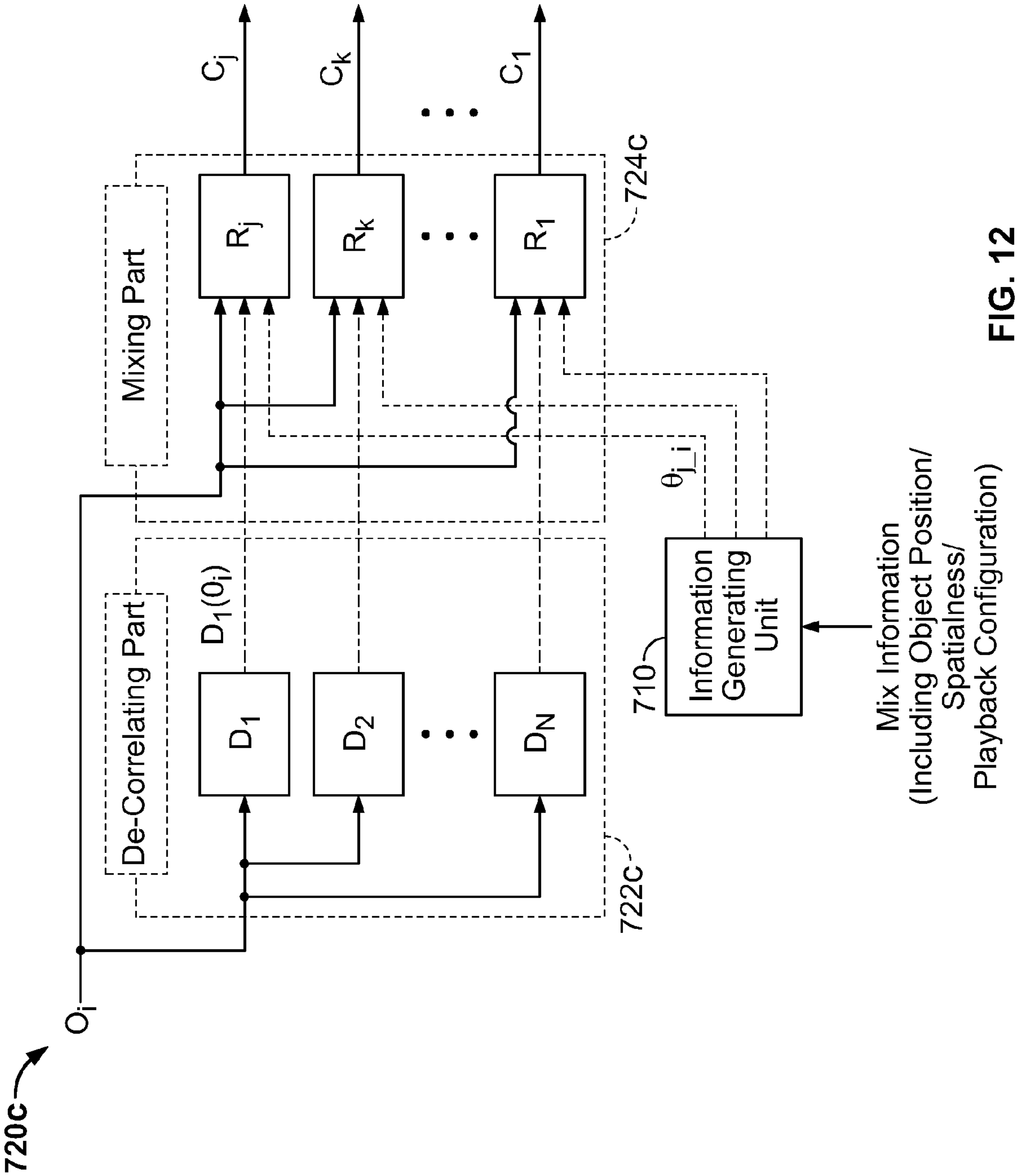
FIG. 12 is an exemplary block diagram of a third embodiment of a downmix processing unit illustrated in FIG. 7.

FIG. 12 is an exemplary block diagram of a third embodiment of a downmix processing unit illustrated in FIG. 7. Referring to FIG. 12, a third embodiment of a downmix processing unit 720*c* (hereinafter simply 'a downmix processing unit 720') can be configured to generate spatial sound signal using input signal $O_i$, which may include a de-correlating part 722*c* with N de-correlators and a mixing part 724*c*. The de-correlating part 722*c* may have N de-correlators $D_1$, $D_2$, . . . , $D_N$ which can be configured to de-correlate the input signal $O_i$. The mixing part 724*c* may have N matrix $R_j$, $R_k$, . . . , $R_l$ which can be configured to generate output signals $C_j$, $C_k$, . . . , $C_l$ using the input signal $O_i$ and the de-correlated signal $D_X(O_i)$. The $R_j$ matrix can be represented as the following formula.

$$C_{j\_i} = R_j O_i$$ [formula 17]

$$C_{j\_i} = \begin{bmatrix} \alpha_{j\_i}\cos(\theta_{j\_i}) & \alpha_{j\_i}\sin(\theta_{j\_i}) \end{bmatrix}\begin{bmatrix} o_i \\ Dx(o_i) \end{bmatrix}$$

$O_i$ is $i^{th}$ input signal, $R_j$ is a matrix mapping $i^{th}$ input signal $O_i$ to $j^{th}$ channel, and $C_{j\_i}$ is $j^{th}$ output signal. The $\theta_{j\_i}$ value is de-correlation rate.

The $\theta_{j\_i}$ value can be estimated base on ICC included in multi-channel parameter. Furthermore, the mixing part 724*c* can generate output signals base on spatialness information composing de-correlation rate $\theta_{j\_i}$ received from user-interface via the information generating unit 710, which does not put limitation on present invention.

The number of de-correlators (N) can be equal to the number of output channels. On the other hand, the de-correlated signal can be added to output channels selected by user. For example, it is able to position certain spatial sound signal at left, right, and center and to output as a spatial sound signal via left channel speaker.

1.3.4 a Case that Downmix Processing Unit Includes a Further Downmixing Part

Figure 13:
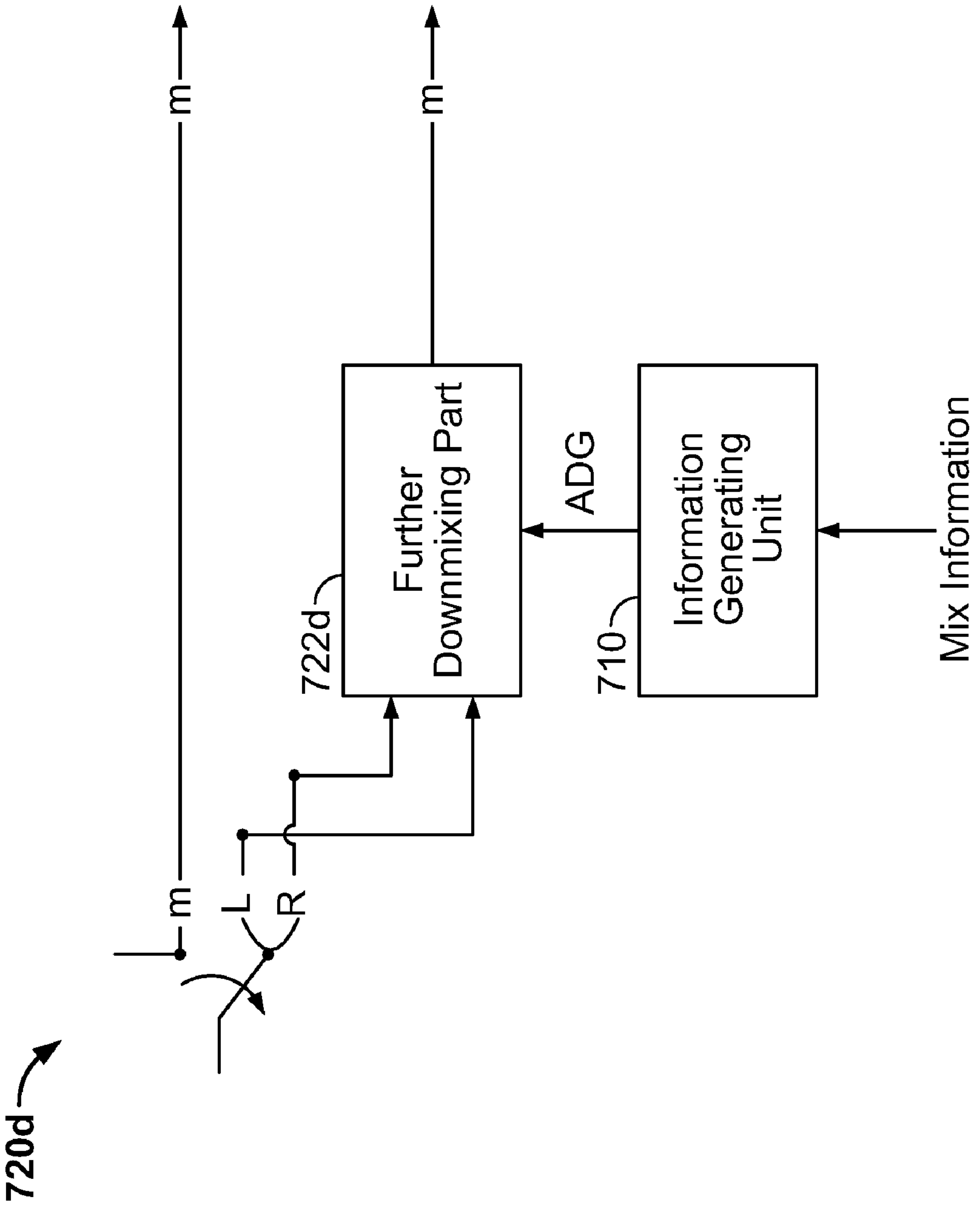
FIG. 13 is an exemplary block diagram of a fourth embodiment of a downmix processing unit illustrated in FIG. 7.

FIG. 13 is an exemplary block diagram of a fourth embodiment of a downmix processing unit illustrated in FIG. 7. A fourth embodiment of a downmix processing unit 720*d* (hereinafter simply 'a downmix processing unit 720*d*') can be configured to bypass if the input signal corresponds to a mono signal (m). The downmix processing unit 720*d* includes a further downmixing part 722*d* which can be configured to downmix the stereo signal to be mono signal if the input signal corresponds to a stereo signal. The further downmixed mono channel (m) is used as input to the multi-channel decoder 730. The multi-channel decoder 730 can control object panning (especially cross-talk) by using the mono input signal. In this case, the information generating unit 710 may generate a multi-channel parameter base on 5-1-$5_1$ configuration of MPEG Surround standard.

Furthermore, if gain for the mono downmix signal like the above-mentioned artistic downmix gain ADG of FIG. 2 is applied, it is able to control object panning and object gain more easily. The ADG may be generated by the information generating unit 710 based on mix information.

2. Upmixing Channel Signals and Controlling Object Signals

Figure 14:
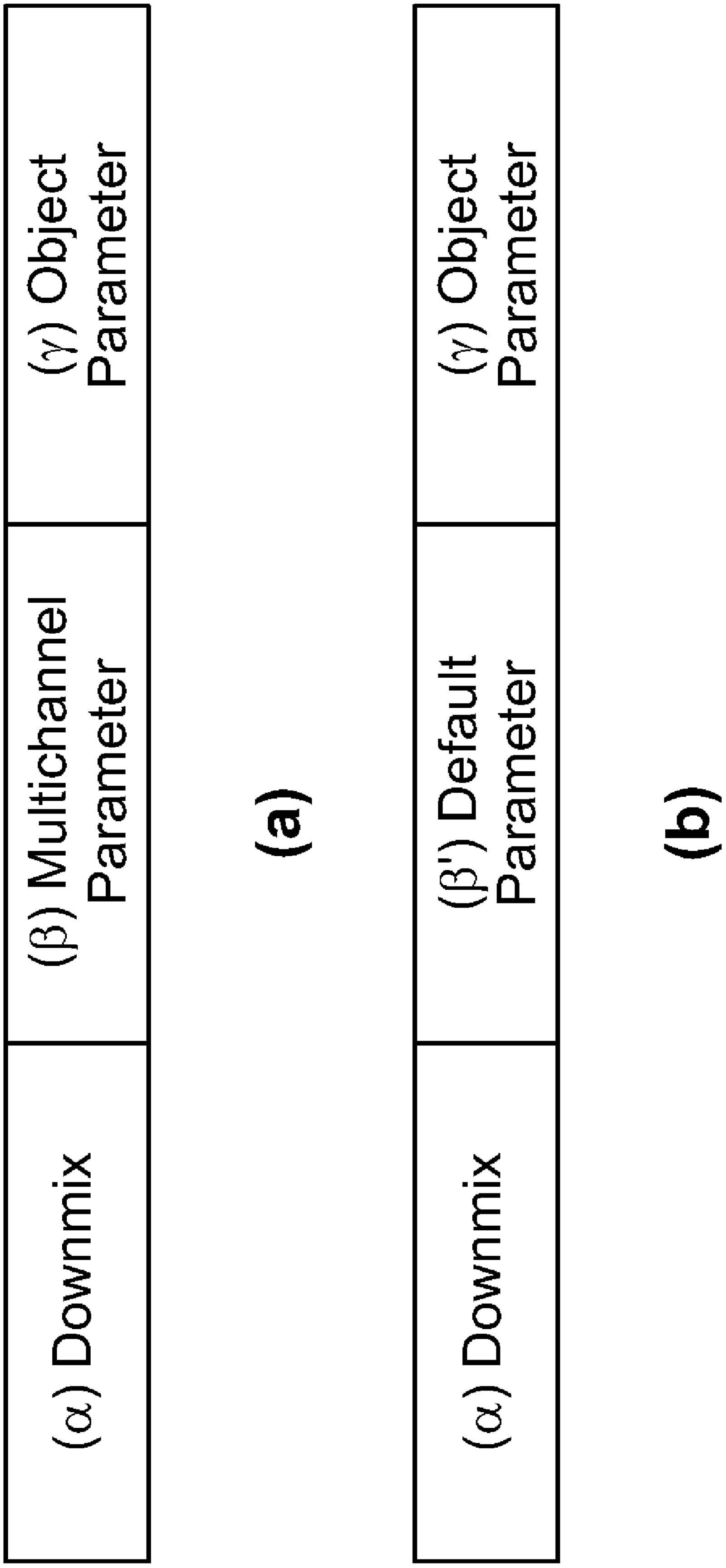
FIG. 14 is an exemplary block diagram of a bitstream structure of a compressed audio signal according to a second embodiment of present invention.
Figure 15:
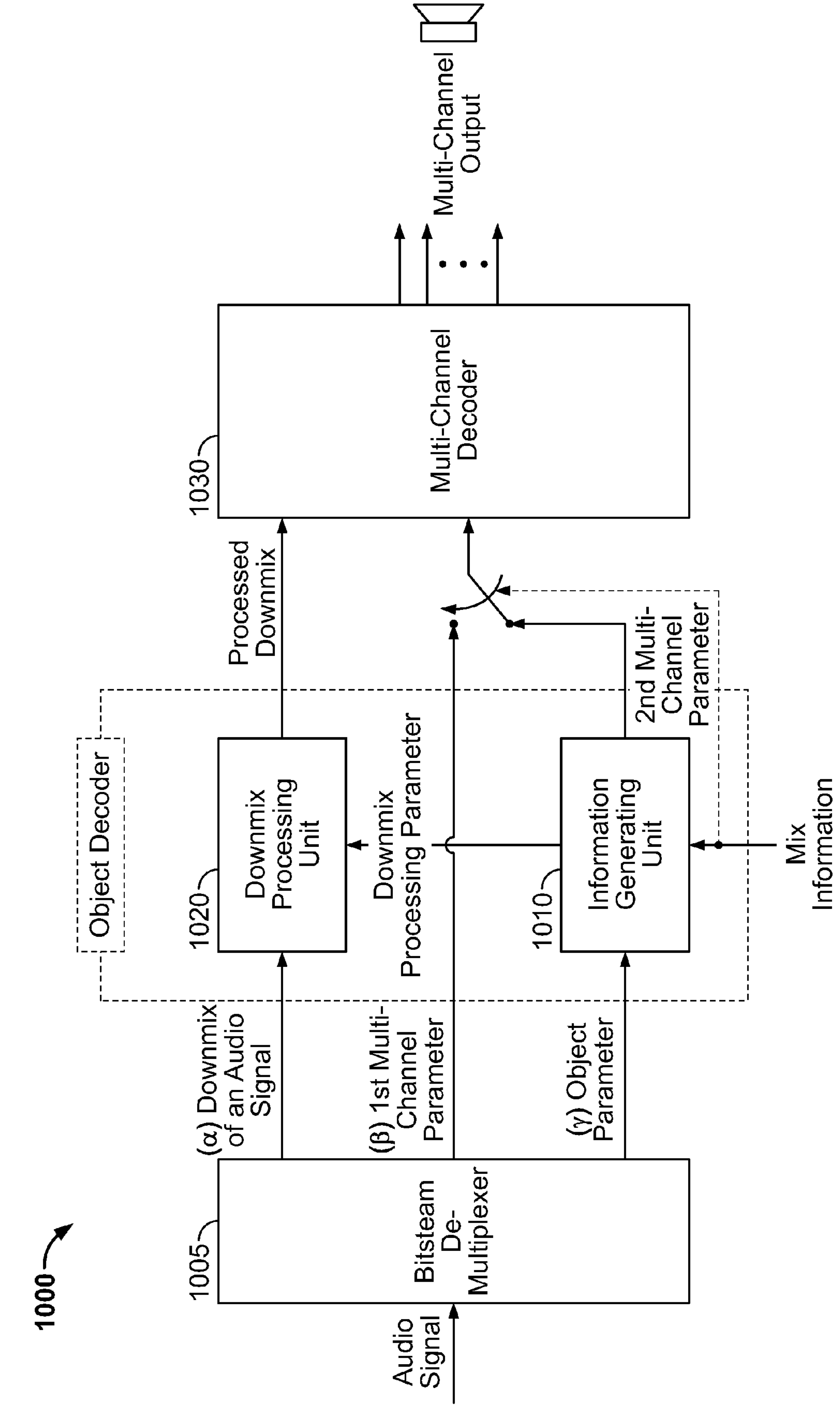
FIG. 15 is an exemplary block diagram of an apparatus for processing an audio signal according to a second embodiment of present invention.

FIG. 14 is an exemplary block diagram of a bitstream structure of a compressed audio signal according to a second embodiment of present invention. FIG. 15 is an exemplary block diagram of an apparatus for processing an audio signal according to a second embodiment of present invention. Referring to (a) of FIG. 14, downmix signal α, multi-channel parameter β, and object parameter γ are included in the bitstream structure. The multi-channel parameter β is a parameter for upmixing the downmix signal. On the other hand, the object parameter γ is a parameter for controlling object panning and object gain. Referring to (b) of FIG. 14, downmix signal α, a default parameter β', and object parameter γ are included in the bitstream structure. The default parameter β' may include preset information for controlling object gain and object panning. The preset information may correspond to an example suggested by a producer of an encoder side. For example, preset information may describes that guitar signal is located at a point between left and center, and guitar's level is set to a certain volume, and the number of output channel in this time is set to a certain channel. The default parameter for either each frame or specified frame may be present in the bitstream. Flag information indicating whether default parameter for this frame is different from default parameter of previous frame or not may be present in the bitstream. By including default parameter in the bitstream, it is able to take less bitrates than side information with object parameter is included in the bitstream. Furthermore, header information of the bitstream is omitted in the FIG. 14. Sequence of the bitstream can be rearranged.

Referring to FIG. 15, an apparatus for processing an audio signal according to a second embodiment of present invention 1000 (hereinafter simply 'a decoder 1000') may include a bitstream de-multiplexer 1005, an information generating unit 1010, a downmix processing unit 1020, and a multi-channel decoder 1030. The de-multiplexer 1005 can be configured to divide the multiplexed audio signal into a downmix α, a first multi-channel parameter β, and an object parameter γ. The information generating unit 1010 can be configured to generate a second multi-channel parameter using an object parameter γ and a mix parameter. The mix parameter comprises a mode information indicating whether the first multi-channel information β is applied to the processed downmix. The mode information may corresponds to an information for selecting by a user. According to the mode information, the information generating information 1020 decides whether to transmit the first multi-channel parameter β or the second multi-channel parameter.

The downmix processing unit 1020 can be configured to determining a processing scheme according to the mode information included in the mix information. Furthermore, the downmix processing unit 1020 can be configured to process the downmix a according to the determined processing scheme. Then the downmix processing unit 1020 transmits the processed downmix to multi-channel decoder 1030.

The multi-channel decoder 1030 can be configured to receive either the first multi-channel parameter β or the second multi-channel parameter. In case that default parameter β is included in the bitstream, the multi-channel decoder 1030 can use the default parameter β' instead of multi-channel parameter β.

Then, the multi-channel decoder 1030 can be configured to generate multi-channel output using the processed downmix signal and the received multi-channel parameter. The multi-channel decoder 1030 may have the same configuration of the former multi-channel decoder 730, which does not put limitation on the present invention.

3. Binaural Processing

A multi-channel decoder can be operated in a binaural mode. This enables a multi-channel impression over headphones by means of Head Related Transfer Function (HRTF) filtering. For binaural decoding side, the downmix signal and multi-channel parameters are used in combination with HRTF filters supplied to the decoder.

Figure 16:
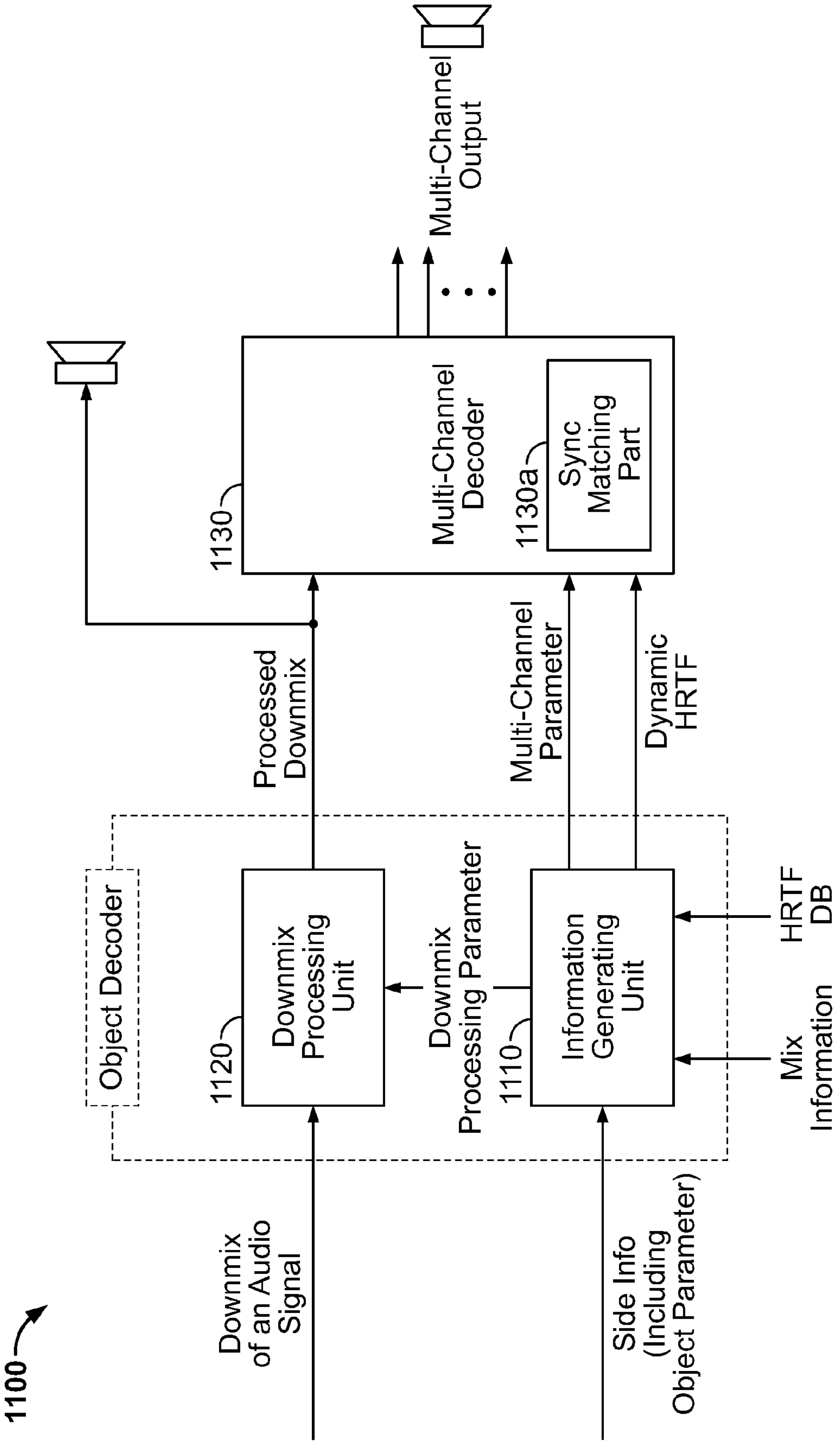
FIG. 16 is an exemplary block diagram of a bitstream structure of a compressed audio signal according to a third embodiment of present invention.

FIG. 16 is an exemplary block diagram of an apparatus for processing an audio signal according to a third embodiment of present invention. Referring to FIG. 16, an apparatus for processing an audio signal according to a third embodiment (hereinafter simply 'a decoder 1100') may comprise an information generating unit 1110, a downmix processing unit 1120, and a multi-channel decoder 1130 with a sync matching part 1130*a*.

The information generating unit 1110 may have the same configuration of the information generating unit 710 of FIG. 7, with generating dynamic HRTF. The downmix processing unit 1120 may have the same configuration of the downmix processing unit 720 of FIG. 7. Like the preceding elements, multi-channel decoder 1130 except for the sync matching part 1130*a* is the same case of the former elements. Hence, details of the information generating unit 1110, the downmix processing unit 1120, and the multi-channel decoder 1130 shall be omitted.

The dynamic HRTF describes the relation between object signals and virtual speaker signals corresponding to the HRTF azimuth and elevation angles, which is time-dependent information according to real-time user control.

The dynamic HRTF may correspond to one of HRTF filter coefficients itself, parameterized coefficient information, and index information in case that the multi-channel decoder comprise all HRTF filter set.

There's need to match a dynamic HRTF information with frame of downmix signal regardless of kind of the dynamic HRTF. In order to match HRTF information with downmix signal, it able to provide three type of scheme as follows:

1) Inserting a tag information into each HRTF information and bitstream downmix signal, then matching the HRTF with bitstream downmix signal based on the inserted tag information. In this scheme, it is proper that tag information may be included in ancillary field in MPEG Surround standard. The tag information may be represented as a time information, a counter information, a index information, etc.

2) Inserting HRTF information into frame of bitstream. In this scheme, it is possible to set to mode information indicating whether current frame corresponds to a default mode or not. If the default mode which describes HRTF information of current frame is equal to the HRTF information of previous frame is applied, it is able to reduce bitrates of HRTF information.

2-1) Furthermore, it is possible to define transmission information indicating whether HRTF information of current frame has already transmitted. If the transmission information which describes HRTF information of current frame is equal to the transmitted HRTF information of frame is applied, it is also possible to reduce bitrates of HRTF information.

3) Transmitting several HRTF information in advance, then transmitting identifying information indicating which HRTF among the transmitted HRTF information per each frame.

Furthermore, in case that HRTF coefficient varies suddenly, distortion may be generated. In order to reduce this distortion, it is proper to perform smoothing of coefficient or the rendered signal.

4. Rendering

Figure 17:
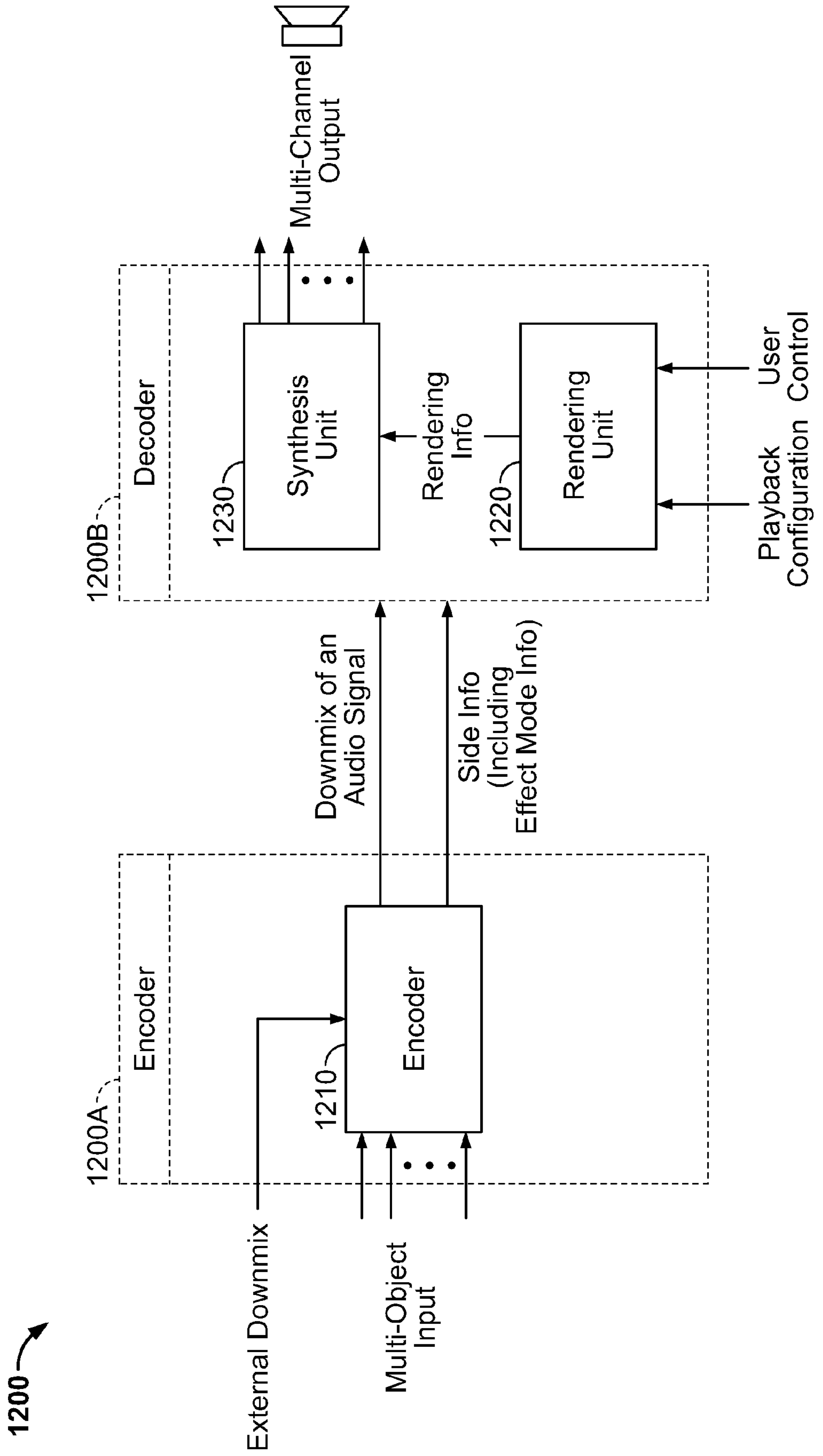
FIG. 17 is an exemplary block diagram of an apparatus for processing an audio signal according to a fourth embodiment of present invention.

FIG. 17 is an exemplary block diagram of an apparatus for processing an audio signal according to a fourth embodiment of present invention. The apparatus for processing an audio signal according to a fourth embodiment of present invention 1200 (hereinafter simply 'a processor 1200') may comprise an encoder 1210 at encoder side 1200A, and a rendering unit 1220 and a synthesis unit 1230 at decoder side 1200B. The encoder 1210 can be configured to receive multi-channel object signal and generate a downmix of audio signal and a side information. The rendering unit 1220 can be configured to receive side information from the encoder 1210, playback configuration and user control from a device setting or a user-interface, and generate rendering information using the side information, playback configuration, and user control. The synthesis unit 1230 can be configured to synthesis multi-channel output signal using the rendering information and the received downmix signal from an encoder 1210.

4.1 Applying Effect-Mode

The effect-mode is a mode for remixed or reconstructed signal. For example, live mode, club band mode, karaoke mode, etc may be present. The effect-mode information may correspond to a mix parameter set generated by a producer, other user, etc. If the effect-mode information is applied, an end user don't have to control object panning and object gain in full because user can select one of pre-determined effect-mode information.

Two methods of generating an effect-mode information can be distinguished. First of all, it is possible that an effect-mode information is generated by encoder 1200A and transmitted to the decoder 1200B. Secondly, the effect-mode information may be generated automatically at the decoder side. Details of two methods shall be described as follow.

4.1.1 Transmitting Effect-Mode Information to Decoder Side

The effect-mode information may be generated at an encoder 1200A by a producer. According to this method, the decoder 1200B can be configured to receive side information including the effect-mode information and output user-interface by which a user can select one of effect-mode information. The decoder 1200B can be configured to generate output channel base on the selected effect-mode information.

Furthermore, it is inappropriate to hear downmix signal as it is for a listener in case that encoder 1200A downmix the signal in order to raise quality of object signals. However, if effect-mode information is applied in the decoder 1200B, it is possible to playback the downmix signal as the maximum quality.

4.1.2 Generating Effect-Mode Information in Decoder Side

The effect-mode information may be generated at a decoder 1200B. The decoder 1200B can be configured to search appropriate effect-mode information for the downmix signal. Then the decoder 1200B can be configured to select one of the searched effect-mode by itself (automatic adjustment mode) or enable a user to select one of them (user selection mode). Then the decoder 1200B can be configured to obtain object information (number of objects, instrument names, etc) included in side information, and control object based on the selected effect-mode information and the object information.

Furthermore, it is able to control similar objects in a lump. For example, instruments associated with a rhythm may be similar objects in case of 'rhythm impression mode'. Controlling in a lump means controlling each object simultaneously rather than controlling objects using the same parameter.

Furthermore, it is able to control object based on the decoder setting and device environment (including whether headphones or speakers). For example, object corresponding to main melody may be emphasized in case that volume setting of device is low, object corresponding to main melody may be repressed in case that volume setting of device is high.

4.2 Object Type of Input Signal at Encoder Side

The input signal inputted to an encoder 1200A may be classified into three types as follow.

1) Mono Object (Mono Channel Object)

Mono object is most general type of object. It is possible to synthesis internal downmix signal by simply summing objects. It is also possible to synthesis internal downmix signal using object gain and object panning which may be one of user control and provided information. In generating internal downmix signal, it is also possible to generate rendering information using at least one of object characteristic, user input, and information provided with object.

In case that external downmix signal is present, it is possible to extract and transmit information indicating relation between external downmix and object.

2) Stereo Object (Stereo Channel Object)

It is possible to synthesis internal downmix signal by simply summing objects like the case of the former mono object. It is also possible to synthesis internal downmix signal using object gain and object panning which may be one of user control and provided information. In case that downmix signal corresponds to a mono signal, it is possible that encoder 1200A use object converted into mono signal for generating downmix signal. In this case, it is able to extract and transfer information associated with object (ex: panning information in each time-frequency domain) in converting into mono signal. Like the preceding mono object, in generating internal downmix signal, it is also possible to generate rendering information using at least one of object characteristic, user input, and information provided with object. Like the preceding mono object, in case that external downmix signal is present, it is possible to extract and transmit information indicating relation between external downmix and object.

3) Multi-Channel Object

In case of multi-channel object, it is able to perform the above mentioned method described with mono object and stereo object. Furthermore, it is able to input multi-channel object as a form of MPEG Surround. In this case, it is able to generate object-based downmix (ex: SAOC downmix) using object downmix channel, and use multi-channel information (ex: spatial information in MPEG Surround) for generating multi-channel information and rendering information. Hence, it is possible to reduce computing amount because multi-channel object present in form of MPEG Surround don't have to decode and encode using object-oriented encoder (ex: SAOC encoder). If object downmix corresponds to stereo and object-based downmix (ex: SAOC downmix) corresponds to mono in this case, it is possible to apply the above-mentioned method described with stereo object.

4) Transmitting Scheme for Variable Type of Object

Figure 18:
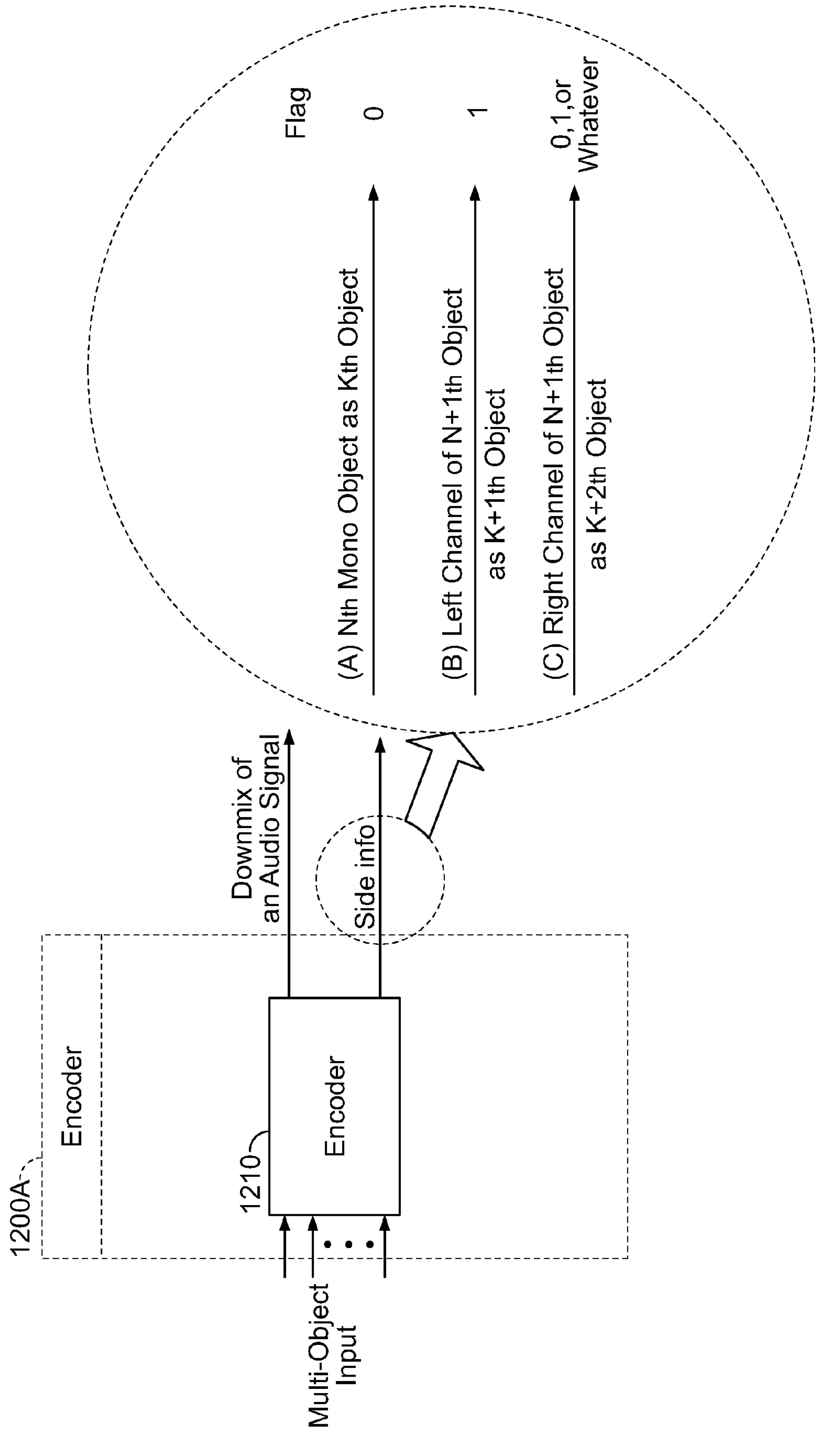
FIG. 18 is an exemplary block diagram to explain transmitting scheme for variable type of object.

As stated previously, variable type of object (mono object, stereo object, and multi-channel object) may be transmitted from the encoder 1200A to the decoder. 1200B. Transmitting scheme for variable type of object can be provided as follow:

Referring to FIG. 18, when the downmix includes a plural object, a side information includes information for each object. For example, when a plural object consists of Nth mono object (A), left channel of N+1th object (B), and right channel of N+1th object (C), a side information includes information for 3 objects (A, B, C).

The side information may comprise correlation flag information indicating whether an object is part of a stereo or multi-channel object, for example, mono object, one channel (L or R) of stereo object, and so on. For example, correlation flag information is '0' if mono object is present, correlation flag information is '1' if one channel of stereo object is present. When one part of stereo object and the other part of stereo object is transmitted in succession, correlation flag information for other part of stereo object may be any value (ex: '0', '1', or whatever). Furthermore, correlation flag information for other part of stereo object may be not transmitted.

Furthermore, in case of multi-channel object, correlation flag information for one part of multi-channel object may be value describing number of multi-channel object. For example, in case of 5.1 channel object, correlation flag information for left channel of 5.1 channel may be '5', correlation flag information for the other channel (R, Lr, Rr, C, LFE) of 5.1 channel may be either '0' or not transmitted.

4.3 Object Attribute

Object may have the three kinds of attribute as follows:

a) Single Object

Single object can be configured as a source. It is able to apply one parameter to single object for controlling object panning and object gain in generating downmix signal and reproducing. The 'one parameter' may mean not only one parameter for all time/frequency domain but also one parameter for each time/frequency slot.

b) Grouped Object

Figure 19:
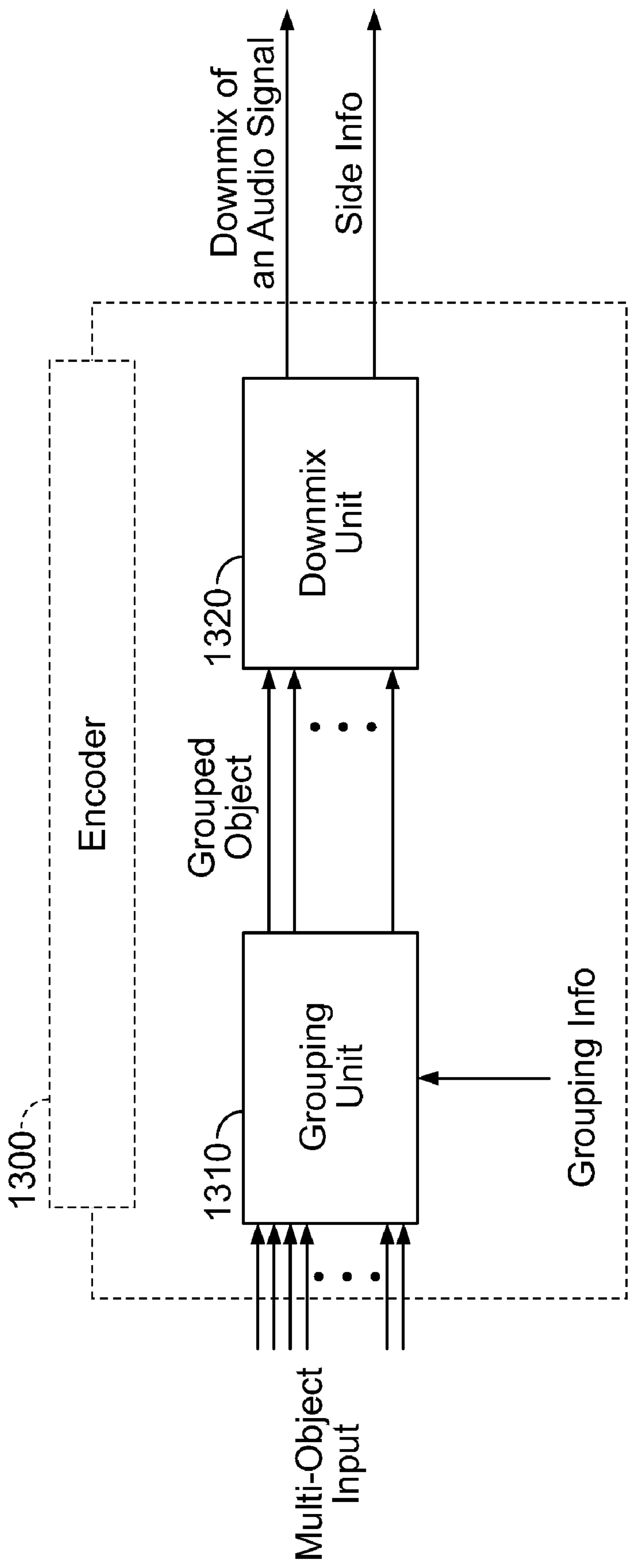
FIG. 19 is an exemplary block diagram to an apparatus for processing an audio signal according to a fifth embodiment of present invention.

Single object can be configured as more than two sources. It is able to apply one parameter to grouped object for controlling object panning and object gain although grouped object is inputted as at least two sources. Details of the grouped object shall be explained with reference to FIG. 19 as follows: Referring to FIG. 19, an encoder 1300 includes a grouping unit 1310 and a downmix unit 1320. The grouping unit 1310 can be configured to group at least two objects among inputted multi-object input, base on a grouping information. The grouping information may be generated by producer at encoder side. The downmix unit 1320 can be configured to generate downmix signal using the grouped object generated by the grouping unit 1310. The downmix unit 1320 can be configured to generate a side information for the grouped object.

c) Combination Object

Combination object is an object combined with at least one source. It is possible to control object panning and gain in a lump, but keep relation between combined objects unchanged. For example, in case of drum, it is possible to control drum, but keep relation between base drum, tam-tam, and symbol unchanged. For example, when base drum is located at center point and symbol is located at left point, it is possible to positioning base drum at right point and positioning symbol at point between center and right in case that drum is moved to right direction.

Relation information between combined objects may be transmitted to a decoder. On the other hand, decoder can extract the relation information using combination object.

4.4 Controlling Objects Hierarchically

It is able to control objects hierarchically. For example, after controlling a drum, it is able to control each sub-elements of drum. In order to control objects hierarchically, three schemes is provided as follows:

a) UI (User Interface)

Only representative element may be displayed without displaying all objects. If the representative element is selected by a user, all objects display.

b) Object Grouping

After grouping objects in order to represent representative element, it is possible to control representative element to control all objects grouped as representative element. Information extracted in grouping process may be transmitted to a decoder. Also, the grouping information may be generated in a decoder. Applying control information in a lump can be performed based on pre-determined control information for each element.

c) Object Configuration

It is possible to use the above-mentioned combination object. Information concerning element of combination object can be generated in either an encoder or a decoder. Information concerning elements from an encoder can be transmitted as a different form from information concerning combination object.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The present invention provides the following effects or advantages.

First of all, the present invention is able to provide a method and an apparatus for processing an audio signal to control object gain and panning unrestrictedly.

Secondly, the present invention is able to provide a method and an apparatus for processing an audio signal to control object gain and panning based on user selection.

What is claimed is:

1. A method for processing an audio signal, comprising:

receiving a downmix signal comprising at least one object signal, receiving object information determined when the downmix signal is generated;

receiving mix information for controlling at least one object signal;

generating multi-channel information using the object information and the mix information, wherein the multi-channel information includes at least one gain modification factor and at least one of a channel level difference, an inter channel correlation and a channel prediction coefficient;

applying the at least one gain modification factor to the downmix signal to generate a gain-modified downmix signal by modifying gain of the downmix signal; and generating a multi-channel signal using the gain-modified downmix signal and at least one of the channel level difference, the inter channel correlation and the channel prediction coefficient, wherein:

the gain modification factor corresponds to a time-sub-band-variant factor for controlling gain of the downmix signal the object information includes at least one of object level information and object correlation information, the downmix signal corresponds to mono signal or stereo signal, and a number of channels of the multi-channel signal is more than a number of channels of the downmix signal.

2. The method of claim 1, wherein the mix information is generated using at least one of object position information and playback configuration information.

3. A computer-readable medium having instructions stored thereon, which, when executed by a processor, causes the processor to perform operations, comprising:

receiving a downmix signal comprising at least one object signal, receiving object information determined when the downmix signal is generated;

receiving mix information for controlling at least one object signal;

generating multi-channel information using the object information and the mix information, wherein the multi-channel information includes at least one gain modification factor and at least one of a channel level difference, an inter channel correlation and a channel prediction coefficient;

applying the at least one gain modification factor to the downmix signal to generate a gain-modified downmix signal by modifying gain of the downmix signal; and, generating a multi-channel signal using the gain-modified downmix signal and at least one of the channel level difference, the inter channel correlation and the channel prediction coefficient, wherein:

the gain modification factor corresponds to a time-sub-band-variant factor for controlling gain of the downmix signal, the object information includes at least one of object level information and object correlation information, the downmix signal corresponds to mono signal or stereo signal, and a number of channels of the multi-channel signal is more than a number of channels of the downmix signal.

4. An apparatus for processing an audio signal, comprising:

an information generating unit receiving a downmix signal comprising at least one object signal, and receiving object information determined when the downmix signal is generated, receiving mix information for controlling at least one object signal, and generating multi-channel information using the object information and the mix information, wherein the multi-channel information includes at least one gain modification factor and at least one of a channel level difference, an inter channel correlation and a channel prediction coefficient; and a multi-channel decoder applying the at least one gain modification factor to the downmix signal to generate a gain-modified downmix signal by modifying gain of the downmix signal, and generating a multi-channel signal using the gain-modified downmix signal and at least one of the channel level difference, the inter channel correlation and the channel prediction coefficient, wherein:

the gain modification factor corresponds to a time-sub-band-variant factor for controlling gain of the downmix signal, the object information includes at least one of object level information and object correlation information, the downmix signal corresponds to mono signal or stereo signal, and a number of channels of the multi-channel signal is more than a number of channels of the downmix signal.

* * * * *

UNITED STATES PATENT AND TRADEMARK OFFICE

CERTIFICATE OF CORRECTION

PATENT NO. : 8,340,325 B2
APPLICATION NO. : 11/952949
DATED : December 25, 2012
INVENTOR(S) : Oh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1327 days.

Signed and Sealed this
Twentieth Day of August, 2013

Teresa Stanek Rea
*Acting Director of the United States Patent and Trademark Office*